United States Patent
Sykora et al.

(10) Patent No.: US 12,427,755 B2
(45) Date of Patent: Sep. 30, 2025

(54) BULK DIFFUSER

(71) Applicant: 3M INNOVATIVE PROPERTIES COMPANY, St. Paul, MN (US)

(72) Inventors: Michael J. Sykora, New Richmond, WI (US); Kui Chen-Ho, Woodbury, MN (US); Guy M. Kallman, Woodbury, MN (US); Ellen O. Aeling, Oakdale, MN (US); Kaitlin R. Mohs, Lake Elmo, MN (US); Patrick J. Yeshe, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 639 days.

(21) Appl. No.: 17/789,610

(22) PCT Filed: Dec. 21, 2020

(86) PCT No.: PCT/IB2020/062304
§ 371 (c)(1),
(2) Date: Jun. 28, 2022

(87) PCT Pub. No.: WO2021/137093
PCT Pub. Date: Jul. 8, 2021

(65) Prior Publication Data
US 2023/0063749 A1    Mar. 2, 2023

Related U.S. Application Data

(60) Provisional application No. 62/954,942, filed on Dec. 30, 2019.

(51) Int. Cl.
| | |
|---|---|
| *B32B 27/08* | (2006.01) |
| *B32B 7/023* | (2019.01) |
| *B32B 7/12* | (2006.01) |
| *B32B 27/20* | (2006.01) |
| *B32B 37/12* | (2006.01) |
| *B32B 37/20* | (2006.01) |
| *B32B 38/00* | (2006.01) |

(52) U.S. Cl.
CPC ............ *B32B 27/08* (2013.01); *B32B 7/023* (2019.01); *B32B 7/12* (2013.01); *B32B 27/20* (2013.01); *B32B 37/12* (2013.01); *B32B 37/203* (2013.01); *B32B 38/145* (2013.01); *B32B 2255/10* (2013.01); *B32B 2264/0214* (2013.01); *B32B 2305/30* (2013.01); *B32B 2307/4023* (2013.01); *B32B 2307/414* (2013.01); *B32B 2307/72* (2013.01); *B32B 2383/00* (2013.01); *B32B 2590/00* (2013.01)

(58) Field of Classification Search
None
See application file for complete search history.

(56) References Cited

U.S. PATENT DOCUMENTS

| | | | |
|---|---|---|---|
| 4,436,377 A | 3/1984 | Miller | |
| 4,871,616 A * | 10/1989 | Kimura | ............. G03G 9/09775 |
| | | | 428/407 |
| 5,874,158 A | 2/1999 | Ludwig et al. | |
| 6,479,142 B1 | 11/2002 | Condon et al. | |
| 6,571,497 B1 | 6/2003 | Aylward et al. | |
| 6,908,202 B2 | 6/2005 | Graf et al. | |
| 8,101,282 B2 | 1/2012 | Lu | |
| 8,808,811 B2 | 8/2014 | Kolb et al. | |
| 9,221,970 B2 | 12/2015 | Schultz et al. | |
| 9,315,064 B2 | 4/2016 | Owusu et al. | |
| 9,465,145 B2 | 10/2016 | Coggio et al. | |
| 2003/0051380 A1 | 3/2003 | Butler et al. | |
| 2003/0174396 A1 | 9/2003 | Murayama et al. | |
| 2008/0303415 A1 | 12/2008 | Suzuri et al. | |
| 2012/0038990 A1 | 2/2012 | Hao et al. | |
| 2014/0345195 A1 | 11/2014 | Velate et al. | |
| 2016/0025906 A1 * | 1/2016 | Liu | ........................... B32B 5/22 |
| | | | 362/330 |
| 2016/0070027 A1 | 3/2016 | Pan et al. | |

FOREIGN PATENT DOCUMENTS

| | | |
|---|---|---|
| CN | 106496902 A | 3/2017 |
| JP | 5222236 Y | 5/1977 |
| JP | S59131720 U | 9/1984 |
| JP | 2010211014 A | 9/2010 |
| JP | 2011109113 A | 6/2011 |
| JP | 2019168597 A | 10/2019 |
| WO | 2011050236 A2 | 4/2011 |

OTHER PUBLICATIONS

3M Instruction Bulletin 4.26, How to Construct Backlit Signs, Release G, Effective Sep. 2015, 25 pages.
Bar, "Plastic light diffusion systems match LED lighting needs," LEDs Magazine, Jul. 31, 2017; 11 pages.
International Search Report for PCT International Application No. PCT/IB2020/062304, mailed on Apr. 16, 2021, 5 pages.

\* cited by examiner

*Primary Examiner* — Sheeba Ahmed

(57) ABSTRACT

This disclosure describes a composition that includes a bulk diffuser that includes a film having a major surface; the film includes a polymer, and a scattering element. The scattering element includes a silicone bead having a mean particle diameter in a range of 2 micrometers (µm) to 9 µm. The linear density of the film is at least 5.1 $W_i$*µm, wherein the linear density equals the product of the mass fraction of the silicone bead ($W_i$) and film thickness in micrometers (µm). This disclosure further describes methods of making the film and the bulk diffuser and methods of using the film including, for example, as a bulk diffuser in a sign box.

19 Claims, 21 Drawing Sheets

T   Transmission (%)
C   Clarity (%)
WI  Whiteness Index

| Ink | None | | | |
|---|---|---|---|---|
| Sample | W | T | C | LED Blur |
| A | 54.81 | 95.7 | 5.6 | YES |
| X | 54.19 | 95.5 | 36.6 | NO |
| Y | 55.66 | 95.2 | 67.3 | NO |
| Z | 55.24 | 96.2 | 43.7 | NO |
| R2 | 62.41 | 64.7 | 1.9 | YES |
| R7 | 57.36 | 94.6 | 89.8 | NO |

| Ink Type | UV | | | | | | | | | | | | | | | | | | | |
|---|---|---|---|---|---|---|---|---|---|---|---|---|---|---|---|---|---|---|---|---|
| Ink Color | W - White | | | C - Cyan | | M - Magenta | | Y - Yellow | | K - Black | | R - Red | | G - Green | | B - Blue | | CMY - Black | | LED Blur |
| Sample | WI | T | C | T | C | T | C | T | C | T | C | T | C | T | C | T | C | T | C | |
| A | 76.78 | 29.2 | 0 | 34.8 | 2.5 | 30.5 | 3.7 | 79.4 | 3.8 | 4.3 | 0 | 28.2 | 2.9 | 28.9 | 2.5 | 8.88 | 0 | 7.22 | 0 | YES |
| X | 78.21 | 27.4 | 4.7 | 34.5 | 3.7 | 30.3 | 4.5 | 79.2 | 4.6 | 4.4 | 4.0 | 27.9 | 4.5 | 28.7 | 4 | 8.78 | 0.3 | #N/A | #N/A | NO |
| Y | 76.7 | 29.4 | 47.7 | 34.8 | 7.2 | 30.4 | 7.2 | 79.1 | 7 | 4.3 | 4.7 | 28.1 | 7.7 | 29.7 | 7.6 | 9.08 | 6.7 | 7.49 | 6.2 | NO |
| Z | 77.96 | 49.5 | 14.5 | 35.6 | 5.5 | 31.1 | 4.8 | 80.1 | 5.2 | 4.53 | 0 | 28.8 | 4.6 | 29.7 | 5.8 | 9.19 | 4 | 7.54 | 2.9 | NO |
| R2 | 79.03 | 25.5 | 0 | 21.8 | 16.3 | 20.5 | 0 | 56.6 | 3.2 | | | | | | | | | | | YES |
| R7 | 78.79 | 27.4 | 51.1 | 41.2 | 16.3 | 35.9 | 12.1 | 84.5 | 12.4 | | | | | | | | | | | NO |

| Ink Type | Solvent (Max 2) | | | | | | | | | | | | | | | | | |
|---|---|---|---|---|---|---|---|---|---|---|---|---|---|---|---|---|---|---|
| Ink Color | C - Cyan | | M - Magenta | | Y - Yellow | | K - Black | | R - Red | | G - Green | | B - Blue | | CMY - Black | | LED Blur |
| Sample | T | C | T | C | T | C | T | C | T | C | T | C | T | C | T | C | |
| A | 56.3 | 5.3 | 44.4 | 6.2 | 83.3 | 5.8 | 8.87 | 2.9 | 36.2 | 6.6 | 44.3 | 5.7 | 20.9 | 5.1 | 13.4 | 4.3 | YES |
| X | 56.4 | 36 | 44 | 48.4 | 83 | 42.4 | 8.96 | 57 | 36.3 | 59.2 | 44.3 | 47.7 | 21 | 51.8 | #N/A | #N/A | NO |
| Y | 57.3 | 49.1 | 44.5 | 55.3 | 82.7 | 49.5 | 8.69 | 66.2 | 36.2 | 67.6 | 44.7 | 60.8 | 20.9 | 65.4 | 13.2 | 66.5 | NO |
| Z | 57.2 | 17.7 | 45 | 16.5 | 83.3 | 14.3 | 8.82 | 15.8 | 36.5 | 16 | 44.8 | 18.5 | 21.3 | 22.8 | 12.5 | 17.5 | NO |
| R2 | | | | | | | | | | | | | | | | | |
| R7 | | | | | | | | | | | | | | | | | |

| Ink Type | Latex | | | | | | | | | | | | | | | | | |
|---|---|---|---|---|---|---|---|---|---|---|---|---|---|---|---|---|---|---|
| Ink Color | C - Cyan | | M - Magenta | | Y - Yellow | | K - Black | | R - Red | | G - Green | | B - Blue | | CMY - Black | | LED Blur |
| Sample | T | C | T | C | T | C | T | C | T | C | T | C | T | C | T | C | |
| A | 51.3 | 30.8 | 31.9 | 39.2 | 78.5 | 39.7 | 16.3 | 33.3 | 29.9 | 38.1 | 45 | 34.5 | 23.6 | 31.5 | 25.1 | 36.3 | NO |
| X | | | | | | | | | | | | | | | | | |
| Y | | | | | | | | | | | | | | | | | |
| Z | | | | | | | | | | | | | | | | | |
| R2 | | | | | | | | | | | | | | | | | |
| R7 | | | | | | | | | | | | | | | | | |

FIG. 9

BULK DIFFUSER

CROSS REFERENCE TO RELATED APPLICATIONS

This application is a national stage filing under 35 U.S.C. 371 of PCT/IB2020/062304, filed Dec. 21, 2020, which claims the benefit of U.S. Provisional Application No. 62/954,942, filed Dec. 30, 2019, the disclosure of which is incorporated by reference in its/their entirety herein.

SUMMARY OF THE INVENTION

This disclosure describes a film that may be used as a bulk diffuser. In some embodiments, the film may be used as a universal diffuser in backlit sign, display, and lighting applications.

In one aspect, this disclosure describes a composition that includes a bulk diffuser that includes a film having a major surface; the film includes a polymer, and a scattering element.

In some embodiments, the scattering element includes a silicone bead having a mean particle diameter in a range of 2 micrometers (μm) to 9 μm. In some embodiments, when the silicone bead has a mean particle diameter of 2 μm, the linear density of the film is at least 5.1 $W_i$*μm; when the silicone bead has a mean particle diameter of 3 μm, the linear density of the film is at least 6 $W_i$*μm; when the silicone bead has a mean particle diameter of 4.1 μm or 4.4 μm, the linear density of the film is at least 13 $W_i$*μm; or when the silicone bead has a mean particle diameter of 9.3 μm, the linear density of the film is at least 15 $W_i$*μm, wherein the linear density equals the product of the mass fraction of the scattering element ($W_i$) and film thickness in micrometers (μm). In some embodiments, the linear density of the film is at least $$1.3562\left(\frac{W_i}{\mu m^2}\right)D_{Bead} + 2.3877\left(\frac{W_i}{\mu m}\right),$$

wherein $W_i$ is the mass fraction of a silicone bead, $D_{Bead}$ is the mean particle diameter of the silicone bead, and $2 \leq D_{Bead} \leq 9.3$.

In another aspect, this disclosure describes methods of making the film and the bulk diffuser. In a further aspect, this disclosure describes methods of using the film including, for example, as a bulk diffuser and/or in a sign box.

As used herein, "diffuser" refers to any material that is able to diffuse specular light (light with a primary direction). A "bulk diffuser" refers to a diffuser having flat surfaces and embedded light-scattering elements and is distinguished from surface diffusers which use surface roughness or structure to refract or scatter light in a number of directions. In some embodiments, however, a bulk diffuser may include a surface diffuser component.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

Unless otherwise specified, "a," "an," "the," and "at least one" are used interchangeably and mean one or more than one.

Also herein, the recitations of numerical ranges by endpoints include all numbers subsumed within that range (for example, 1 to 5 includes 1, 1.5, 2, 2.75, 3, 3.80, 4, 5, etc.).

Herein, "up to" a number (for example, up to 50) includes the number (for example, 50).

For any method disclosed herein that includes discrete steps, the steps may be conducted in any feasible order. And, as appropriate, any combination of two or more steps may be conducted simultaneously.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

All headings are for the convenience of the reader and should not be used to limit the meaning of the text that follows the heading, unless so specified.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are

BRIEF DESCRIPTION OF THE FIGURES

FIG. 9 shows the percent (%) transmission (T) and percent (%) clarity (C) of film samples printed with various colors, as described in Example 3. Also included is the whiteness index (WI) of the white ink used for printing.

DETAILED DESCRIPTION OF ILLUSTRATIVE EMBODIMENTS

Figure 1:
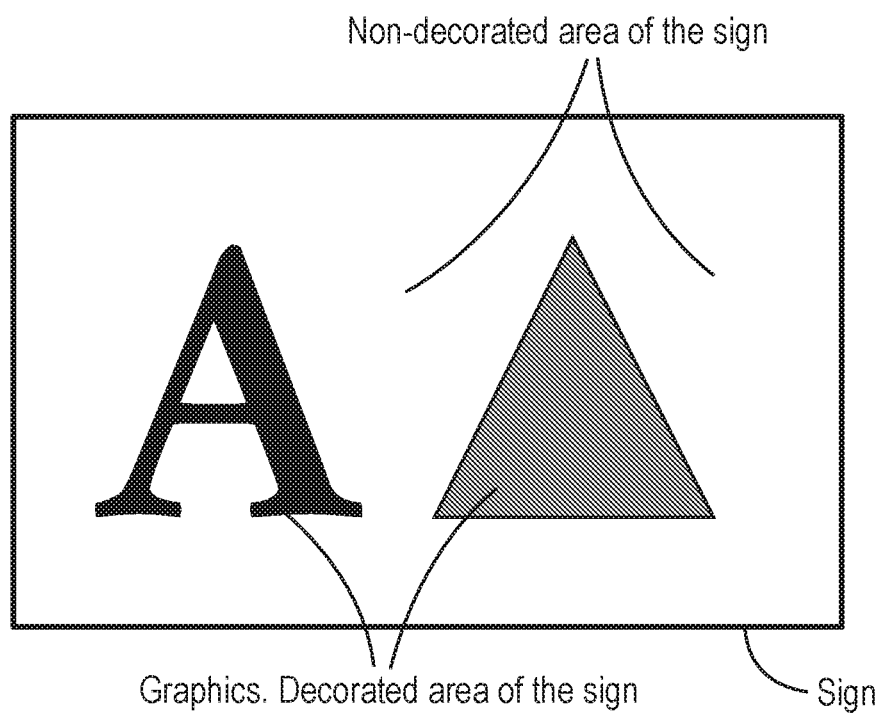
FIG. 1 shows an exemplary sign that could be back lit illuminated including both decorated areas and non-decorated areas.

This disclosure describes films, methods of making the films, and methods of using the films. In some embodiments, the films are preferably used as a bulk diffuser including, for example, in the construction of a sign.

At the time of the invention, a better film for use in backlit illuminated signs was desired. Existing back lit signs were not high in light efficiency (that is, light transmission from back light source to the viewer was not high), requiring the use of additional light sources and power supplies. Additionally, some signs, particularly those incorporating point light source such as LEDs, had visual hotspots (where point light sources penetrated a diffuser). To avoid visual hotspots, typical signs included a thick and heavy diffusive plate, a thin diffusive film, and/or longer distances between a back light source and a front sign face. In addition, extra light sources were sometimes added for more uniform light distribution, requiring the use of additional power supplies. Moreover, existing back lit signs usually included a separate clear printing substrate in addition to a diffusive substrate, requiring the incorporation of additional materials and bulk.

The films described in this disclosure exhibit high transmission, allowing them to reduce component costs by improving light efficiency (allowing for fewer light sources and light source power supplies to be used). By the reduction of electronic components, the systems using the film have increased electrical efficiency. The films also exhibit high haze and low clarity, resulting in the reduction or elimination of visual hotspots and, in some embodiments, allowing for fewer light sources and power supplies. Because of the high haze and low clarity of the films, the films may be used to replace a thick and heavy diffusive plate (such as a diffusive acrylate or polycarbonate plate) typically used for a backlit sign box, and may reduce the distance between back light source and front sign face, thus reducing the weight and thickness of the sign box itself.

In addition, when the film includes an ink-receptive surface, the film may be used as a substrate for ink, eliminating the need for some of the layers typically incorporated in a backlit illuminated sign box. Further, because the films may be thin (for example, less than 150 microns, or even more preferably less than 100 microns), it may be easier to print on the films than printing on thicker substrates typically used in backlit sign boxes which require more specialized printing equipment and material handling. Additionally, due to the high transmission of the films, the printed surface of the film can be placed facing the inside (that is, facing the light source) of the light box, instead of facing outside (that is, facing ambient conditions). Therefore, the printed graphic image is less susceptible to damage due to chemical, mechanical, UV exposure (such as finger rubbing, dust, cleaning, sunlight, etc.).

Films

In one aspect, this disclosure describes a film that includes a polymer and a scattering element.

Polymer

The polymer may include any suitable polymer. In some embodiments, the polymer includes a clear polymer. For example, the polymer may include a vinyl polymer (for example, polyvinyl chloride (PVC), polyvinyl alcohol, polyvinyl fluoride, polyvinylidene difluoride), polystyrene, polylactic acid (PLA), nylon (for example, nylon 6, nylon 6,6, nylon 12, etc.), ethylene acrylic acid (EAA), ethylene vinyl acetate (EVA), ethylene methacrylates (EMA), a cellulose ester (for example, cellulose triacetate, cellulose acetate propionate, cellulose acetate butyrate, cellulose tripropionate, and cellulose diacetate), a polyolefin (for example, polyethylene, polypropylene, norbornene polymer, polypropylene (PP), high density polyethylene (HDPE), low density polyethylene (LDPE), linear low density polyethylene (LLDPE), metallocene polyethylene (mPE)), a polyester (for example, polymethacrylic ester, polyacrylic ester, polyethylene terephthalate (PET), or glycol-modified polyethylene terephthalate (PETG)), polycarbonate, cyclo-olefin polymer, polyalylate, polysulfone, polyamide, polyimide, cyclo-olefin copolymer, acrylic polymers, styrene acrylic polymers, polyurethane (PU), polyurethane-acrylic copolymer, polyurethane-acrylic blend, urethane-acrylic hybrid polymer, or a combination (for example, a mixture) thereof. In some embodiments, the polymer preferably includes the polymer includes polyvinyl chloride (PVC), polyurethane, or poly lactic acid (PLA), or a combination thereof. In some embodiments, the polymer preferably includes polyvinyl chloride (PVC).

In some embodiments, the polymer or combination of polymers may be selected based on the desired properties of the final film. In an exemplary embodiment, when a rigid film is desired, the polymer may include, for example, polycarbonate, an acrylic polymer, or glycol-modified polyethylene terephthalate (PETG), or a combination thereof. In another exemplary embodiment, when a flexible film is desired, the polymer may include, for example, polyvinyl chloride (PVC), polycarbonate, or polyolefin, or a combination thereof.

In some embodiments, the scattering element may be added into a clear base which includes the polymer or combination of polymers. The clear base may also include any other suitable components in addition to the polymer. Exemplary additional components include a solvent, a heat stabilizer, a UV stabilizer, a flow agent, or a plasticizer, or a combination thereof. If included, a solvent, a heat stabilizer, a UV stabilizer, a flow agent, and/or a plasticizer is selected to be compatible with the polymer or combination of polymers. In some embodiments, the clear base may include the components as exemplified in the Examples. In an exemplary embodiment, the clear base may include the components and proportions thereof as exemplified in the Examples.

Scattering Element

The scattering element included in the film enables high transmission and low clarity in the final film. Without wishing to be bound by theory, it is believed the ability of the scattering element to maximize forward scatter while minimizing reflected back scatter enables the high transmission and low clarity in the final film. When the film is used as a bulk diffuser, the scattering elements typically have a different refractive index from the polymer. In some embodiments, including when the polymer includes PVC, the scattering element preferably includes a silicone bead.

In some embodiments, the silicone bead is preferably a spherical silicone bead. Spherical shapes can be characterized by their aspect ratio (wherein the aspect ratio is defined as the ratio of the particle diameter along the major axis of the particle and the particle diameter along the minor axis (major axis/minor axis)). As used here, "spherical" beads have an aspect ratio of between 0.2 and 5, preferably between 0.5 and 2, more preferably between 0.8 and 1.2, most preferably between 0.9 and 1.1. "Spherical" is not intended to indicate that the surface of the bead is entirely smooth.

As used herein, the mean particle diameter refers to the arithmetic mean of the particle diameters of one hundred particles (for example, beads) of a population of particles. When a particle has a spherical shape or a near-spherical shape, the particle diameter is constant or nearly constant regardless of the direction of measurement. When the particle has a non-spherical shape, volume mean diameter (based on volume-based particle size) is used to determine the particle diameter.

As used herein, a "population of particles" refers to particles having a particle diameter within +/−0.9 µm of a mean particle diameter. For example, a population of particles having a mean particle diameter of 2 µm would include particles having a diameter of at least 1.1 µm and up to 2.9 µm. In another example, a population of particles having a mean particle diameter of 4.4 µm would include particles having a diameter of at least 3.5 µm and up to 5.3 µm. If the mean particle diameter is less than 0.9 µm, the particle has a particle diameter greater than 0 and up to 0.9 µm larger than the mean particle diameter.

In some embodiments, the silicone bead has a mean particle diameter of at least 0.5 micrometer (µm), at least 0.6 µm, at least 0.7 µm, at least 0.8 µm, at least 0.9 µm, at least 1 µm, at least 2 µm, at least 3 µm, at least 4 µm, at least 5 µm, at least 6 µm, at least 7 µm, at least 8 µm, or at least 9 µm. In some embodiments, the silicone bead has a mean particle diameter of up to 4 µm, up to 5 µm, up to 6 µm, up to 7 µm, up to 8 µm, up to 9 µm, up to 10 µm, up to 15 µm, or up to 20 µm. In an exemplary embodiment, the spherical silicone bead has a mean particle diameter in a range of 2 µm to 7 µm. In a further exemplary embodiment, the spherical silicone bead has a mean particle diameter in a range of 2 µm to 4.5 µm. In an additional exemplary embodiment, the spherical silicone bead has a mean particle diameter in a range of 2 µm to 4 µm. In yet another exemplary embodiment, the spherical silicone bead has a mean particle diameter in a range of 2 µm to 3 µm.

In some embodiments, the silicone bead may include silicone beads having different diameters. For example, a first silicone bead may have a mean particle diameter of at least 0.5 micrometer (µm), at least 0.6 µm, at least 0.7 µm, at least 0.8 µm, at least 0.9 µm, at least 1 µm, at least 2 µm, at least 3 µm, at least 4 µm, at least 5 µm, at least 6 µm, at least 7 µm, at least 8 µm, or at least 9 µm. The first silicone bead may have a mean particle diameter of up to 4 µm, up to 5 µm, up to 6 µm, up to 7 µm, up to 8 µm, up to 9 µm, up to 10 µm, up to 15 µm, or up to 20 µm. A second silicone bead may have a mean particle diameter of at least 0.5 micrometer (µm), at least 0.6 µm, at least 0.7 µm, at least 0.8 µm, at least 0.9 µm, at least 1 µm, at least 2 µm, at least 3 µm, at least 4 µm, at least 5 µm, at least 6 µm, at least 7 µm, at least 8 µm, or at least 9 µm. The second silicone bead may have a mean particle diameter of up to 4 µm, up to 5 µm, up to 6 µm, up to 7 µm, up to 8 µm, up to 9 µm, up to 10 µm, up to 15 µm, or up to 20 µm. For example, the silicone bead may include a first silicone bead having a mean particle diameter in a range of 2 µm to 4 µm and a second silicone bead having a mean particle diameter in a range of 4 µm to 7 µm.

In some embodiments, the scattering element preferably includes methyl silsesquioxane. For example, the silicone bead may include a methyl silsesquioxane bead.

In some embodiments, the silicone bead includes a Tospearl® bead (Momentive Performance Materials, Waterford, NY) including, for example, T120, T130, T2000A, T2000B, or T1100.

In some embodiments, the scattering element may further include non-silicone scattering particles in addition to a silicone bead. In some embodiments, the non-silicone scattering particles include nanoparticles such as nanocalcite ($CaCO_3$) particles as disclosed in U.S. Pat. No. 9,221,970 (Nanocalcite Composites), titanium dioxide ($TiO_2$) nanoparticles, antimony trioxide ($Sb_2O_3$) nanoparticles, aluminum trihydride ($AlH_3$) nanoparticles, etc. In some embodiments, the scattering elements include voids or nanovoided coating as disclosed in U.S. Pat. No. 8,808,811 ("Process and Apparatus for a Nanovoided Article") and U.S. Patent Pub. No. U.S. 2012/0038990 ("Optical Film"). The silicone bead and, if included, the non-silicone scattering particles or voids have a different refractive index from the polymer. In some embodiments, the presence of non-silicone scattering particles or voids may preferably be minimized because of their potential adverse effects on the clarity and/or transmission of the film.

In some embodiments, the difference between the refractive index of the scattering element and the refractive index of the polymer is at least 0.01, at least 0.02, at least 0.05, at least 0.1, at least 0.3, at least 0.4, or at least 0.8. In some embodiments, the difference between the refractive index of the scattering element and the refractive index of the polymer is up to 0.1, up to 0.2, up to 0.3, up to 0.4, up to 0.8, or up to 1.2. In an exemplary embodiment, the difference between the refractive index of the scattering element and the refractive index of the polymer is in a range of 0.01 to 0.4. In another exemplary embodiment, and the difference between the refractive index of the scattering element and the refractive index of the polymer is in a range of 0.05 to 0.3. In further exemplary embodiment, the difference between the refractive index of the scattering element and the refractive index of the polymer is in a range of 0.8 to 1.2.

In another exemplary embodiment, when the scattering elements include Tospearl® beads and the polymer includes PVC, the difference between the refractive index of the scattering element and the refractive index of the polymer is 0.11.

In some embodiments, the scattering element included in the film is evenly dispersed throughout the film. In some embodiments, the scattering element included in the film is evenly dispersed throughout a layer of the film that includes the scattering element. In some embodiments, the scattering element included in the film may preferably be evenly dispersed throughout a major plane of the film. In some embodiments, differing mass fractions of the scattering element may be included in different layers of the film. In some embodiments, the scattering element may form a gradient in a direction perpendicular to a major plane of the film, wherein the gradient is formed within a layer that includes the scattering element or within layers of the film that include the scattering element.

In some embodiments, including when the film includes multiple layers, as further discussed below, the scattering element may be found only in one or some—but not all-layers of the film. In other embodiments, when the film includes multiple layers, the scattering element may be found in all layers of the film. In some embodiments, the scattering element included in a layer of the film may preferably be evenly dispersed throughout the layer—that is, coagulation or clustering of scattering elements within the layer of the film is avoided.

In some embodiments, the scattering element includes a particle or a void having a refractive index of at least 1, at least 1.1, at least 1.2, at least 1.3, at least 1.4, at least 1.5, at least 1.6, at least 1.7, at least 1.8, at least 1.9, or at least 2. In some embodiments, the scattering element includes a particle having a refractive index of up to 1.4, up to 1.5, up to 1.6, up to 1.8, up to 1.9, up to 2, up to 2.1, up to 2.2, up to 2.3, up to 2.4, up to 2.5, up to 2.6, up to 2.7, or up to 2.8. In exemplary embodiments, the scattering element may include a particle having a refractive index in a range of 1 to 2, or in a range of 1.3 to 1.6. In a further exemplary embodiment, including, for example, when the scattering element is a Tospearl® bead, the scattering element includes a particle having a refractive index of 1.4.

In some embodiments, the film may further include a diffusing pigment, that is, a scattering particle that is not forward-scattering and/or decreases transmission of the resulting film. Exemplary diffusing pigments include $TiO_2$ particles, $SiO_2$ particles, precipitate calcium carbonate, aluminum trihydride, $ZrO_2$ particles, and $BaSO_4$ particles. In contrast to a non-silicone scattering particle, as discussed above, a diffusing pigment has an average particle size that is greater than 0.5 micron (500 nm), or, in some embodiments, greater than 0.7 micron (700 nm).

Clarity, Transmission, and Haze

Diffusion performance of a film is determined by light transmission (transparency) level and light diffusion (clarity and haze). It is challenging—but desirable—to achieve a film with both a high light diffusion level (which allows blurring of a point light source and a "soft" light) and a high light transmission level (indicating that the film transmits as much of the original source light level as possible).

Transmission as used herein is defined by ASTM D1003-13. In some embodiments, the film exhibits a percent (%) transmission of at least 70, at least 75, at least 80, at least 85, or at least 90. Because transmission is a measure of the amount of light that passes through the film, higher transmission levels allow for a more efficient light system despite the system exhibiting poor light recycling efficiency. Increase efficiency of the light system may be exhibited by, for example, increased lumens transmitted relative to lumens generated by the light source. In some embodiments, the film exhibits a percent (%) transmission of up to 95%, up to 96%, or up to 97%.

Clarity is a measure of the amount of light that is subject to narrow angle scattering, as defined by ASTM D1003-13. In some embodiments, the film exhibits a percent clarity of up to 5.6, up to 6, up to 7, up to 8, up to 9, up to 10, up to 11, up to 12, up to 13, up to 14, or up to 14.2. In some embodiments, the film exhibits a percent clarity of at least 1, at least 2, at least 3 or at least 3.5. As further described in the Examples, point light sources such as LEDs were blurred when the clarity of the film was up to 5.6%, and non-LED light sources were blurred when the clarity was up to 14.2%. In an exemplary embodiment, the film exhibits a percent clarity in a range of 3 to 14.2. In another exemplary embodiment, the film exhibits a percent clarity in a range of 3 to 5.6.

As shown in the Examples, the films of commercially available comparative samples R1-R7 (see Table 6A-Table 6B) had a maximum transmission of less than 70% (for example, R1-R6) or a clarity of greater than 14.2% (for example, R7). In contrast, a bulk diffuser having a percent transmission of at least 70 and a percent clarity of up to 14.2 allows for a more efficient light system—the high transmission allows for fewer light sources and light source power supplies to be used—that blurs both point light sources and fluorescent (tube) light sources.

Haze, as used herein, is a measure of the light that is subject to wide angle scatting, as defined by ASTM D1003-13. In some embodiments, the film exhibits a percent haze of at least 95, at least 96, at least 97, at least 98, or at least 99. Haze is the amount of light that is subject to wide-angle scattering. Even though haze does not impact the overall performance of the film as a diffuser in the examples of this application, in some applications, higher amounts of haze may contribute to an improvement in the general angular uniformity of diffusion.

Layers, Thickness, and Rigidity

In some embodiments, the film includes a single layer. In some embodiments, the film may include multiple layers. When the film includes multiple layers, the scattering element may be distributed in a single layer or may be distributed in two, three, four, etc. layers of the film. In embodiments, when the film includes multiple layers, the scattering element may be distributed in all the layers of the film.

In some embodiments, the film may have a thickness of at least 10 micrometers (μm), at least 15 μm, at least 20 μm, at least 25 μm, at least 30 μm, at least 50 μm, at least 75 μm, at least 100 μm, at least 150 μm, at least 200 μm, at least 250 μm, at least 500 μm, or at least 750 μm. In some embodiments, the film may have a thickness of up to 50 μm, up to 75 μm, up to 100 μm, up to 200 μm, up to 250 μm, up to 300 μm, up to 400 μm, up to 500 μm, up to 600 μm, up to 700 μm, up to 750 μm, up to 1000 μm (1 mm), up to 5 mm, up to 10 mm, up to 12 mm, up to 15 mm, up to 20 mm, or up to 25 mm.

In an exemplary embodiment, the film may have a thickness in a range of 10 μm to 25 mm. In a further exemplary embodiment, the film may have a thickness in a range of 25 μm to 12 mm. In some embodiments, the film may have a thickness in a range of 25 μm to 600 μm.

In some embodiments, including, for example, when the film is a flexible film, the thickness may be in a range of 10 μm to 750 μm. In some embodiments, including, for example, when the film is a more rigid film, the thickness may be in a range of 750 μm to 25 mm.

In some embodiments the film may be joined (for example, laminated or adhered) to an adhesive including, for example, a pressure sensitive adhesive (PSA).

In some embodiments the film may be joined (for example, laminated or adhered) to a strength reinforcing fabric or a scrim.

Linear Density

The linear density of the film is at least 5.1 $W_i$*μm. The linear density equals the product of the mass fraction of the scattering element ($W_i$) and film thickness in micrometers (μm). In some embodiments, the linear density of the film is at least 5.1 $W_i$*μm, at least 5.5 $W_i$*μm, at least 6 $W_i$*μm, at least 6.5 $W_i$*μm, at least 7 $W_i$*μm, at least 7.5 $W_i$*μm, at least 8 $W_i$*μm, at least 8.5 $W_i$*μm, at least 9 $W_i$*μm, or at least 10 $W_i$*μm, wherein the mass fraction of the scattering element ($W_i$) does not exceed 0.64. In some embodiments, the linear density of the film is up to 10 $W_i$*μm, up to 20 $W_i$*μm, or up to 30 $W_i$*μm, wherein the mass fraction of the scattering element ($W_i$) does not exceed 0.64.

For the purposes of calculating linear density, the film thickness includes the thickness of a layer of film (or any layers of film) that includes a scattering element. The thickness of a film layer not including a scattering element (for example, a clear layer or an adhesive layer) would not be included in the film thickness for the purposes of calculating linear density.

In embodiments where differing mass fractions of the scattering element are included in different layers of the film, the thickness of the film layers for the purposes of calculating the linear density is weighted to adjust for the weighted average of the scattering element within each layer.

Figure 5:
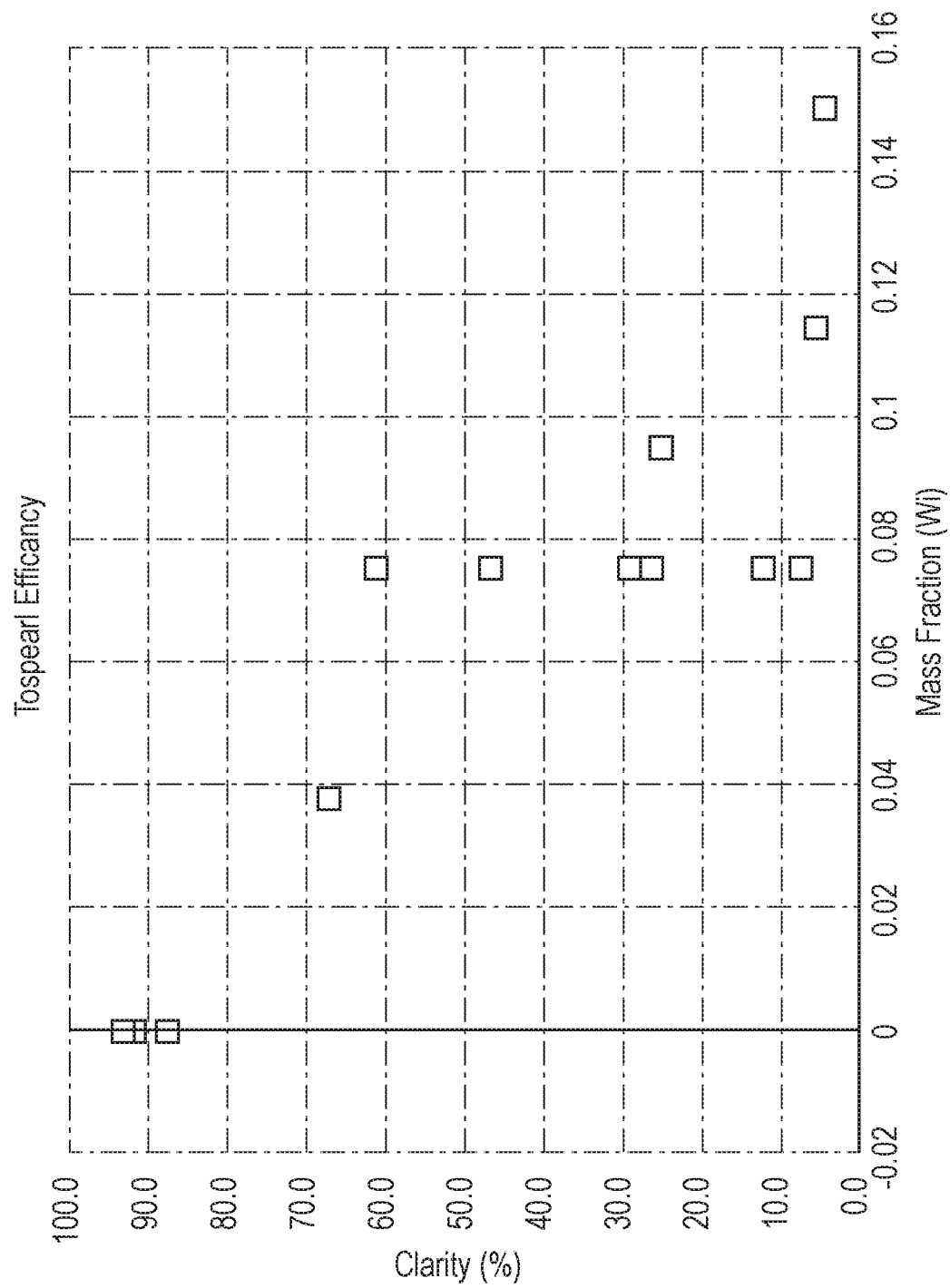
FIG. 5 shows percent (%) clarity plotted against mass fraction ($W_i$) to show the impact of mass fraction of a spherical silicone (Tospearl® T130) bead on clarity. Films included T130 Tospearl® Beads with dry weight percentages ranging from 3.8% to 15% and having thicknesses ranging from 31 μm to 79 μm.
Figure 6:
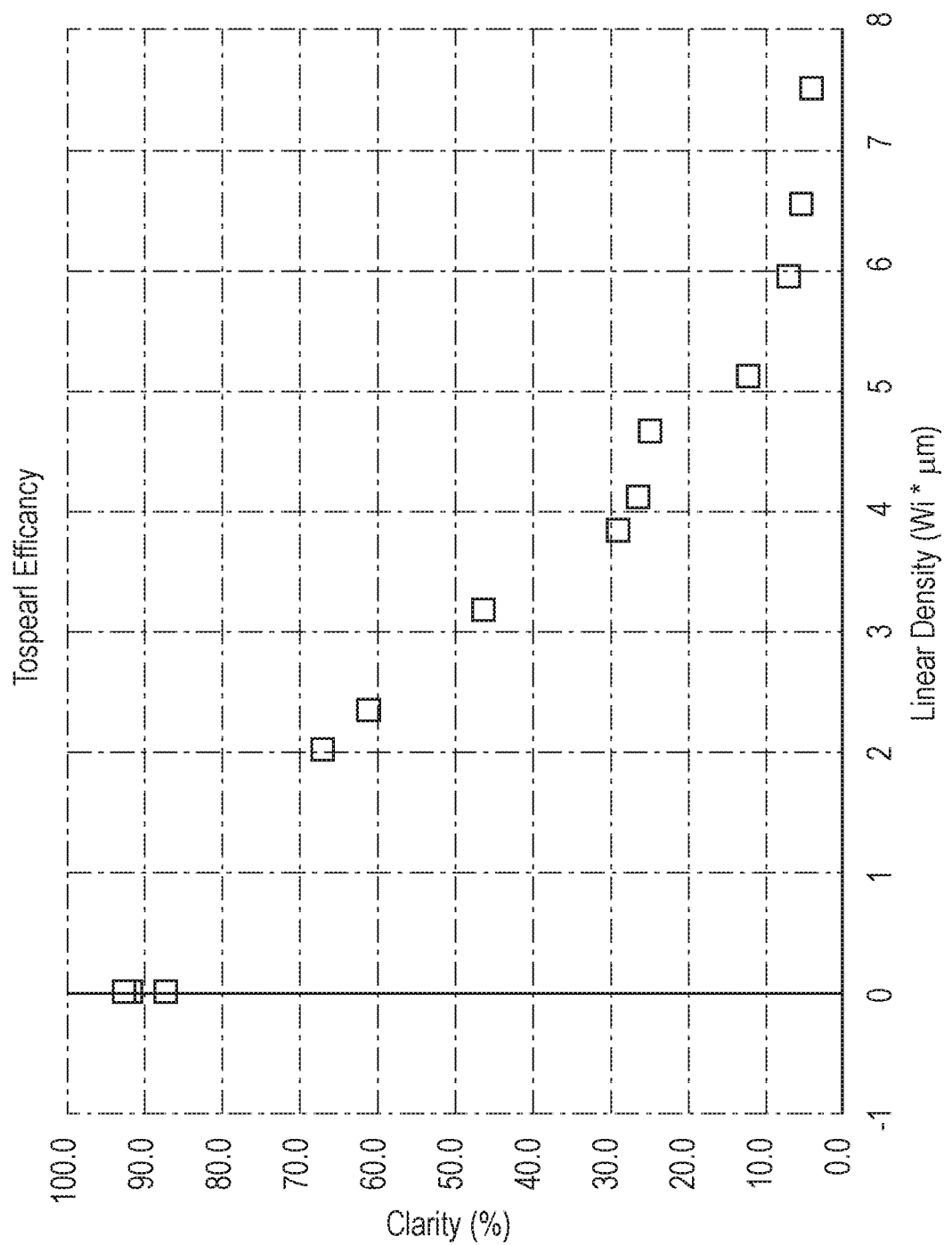
FIG. 6 shows percent (%) clarity plotted against linear density, calculated as described in the Examples, to show the impact of linear density of a spherical silicone (Tospearl® T130) bead on clarity. Films included T130 Tospearl® Beads with dry weight percentages ranging from 3.8% to 15% and having thicknesses ranging from 31 μm to 79 μm.

As further explained in the Examples and shown in FIG. 5 and FIG. 6, plotting the linear density (instead of mass fraction) of the film against various measured properties of the films (for example, transmission or clarity), allows for the evaluation of the effectiveness of a scattering element across a broad range of film thicknesses.

Figure 7:
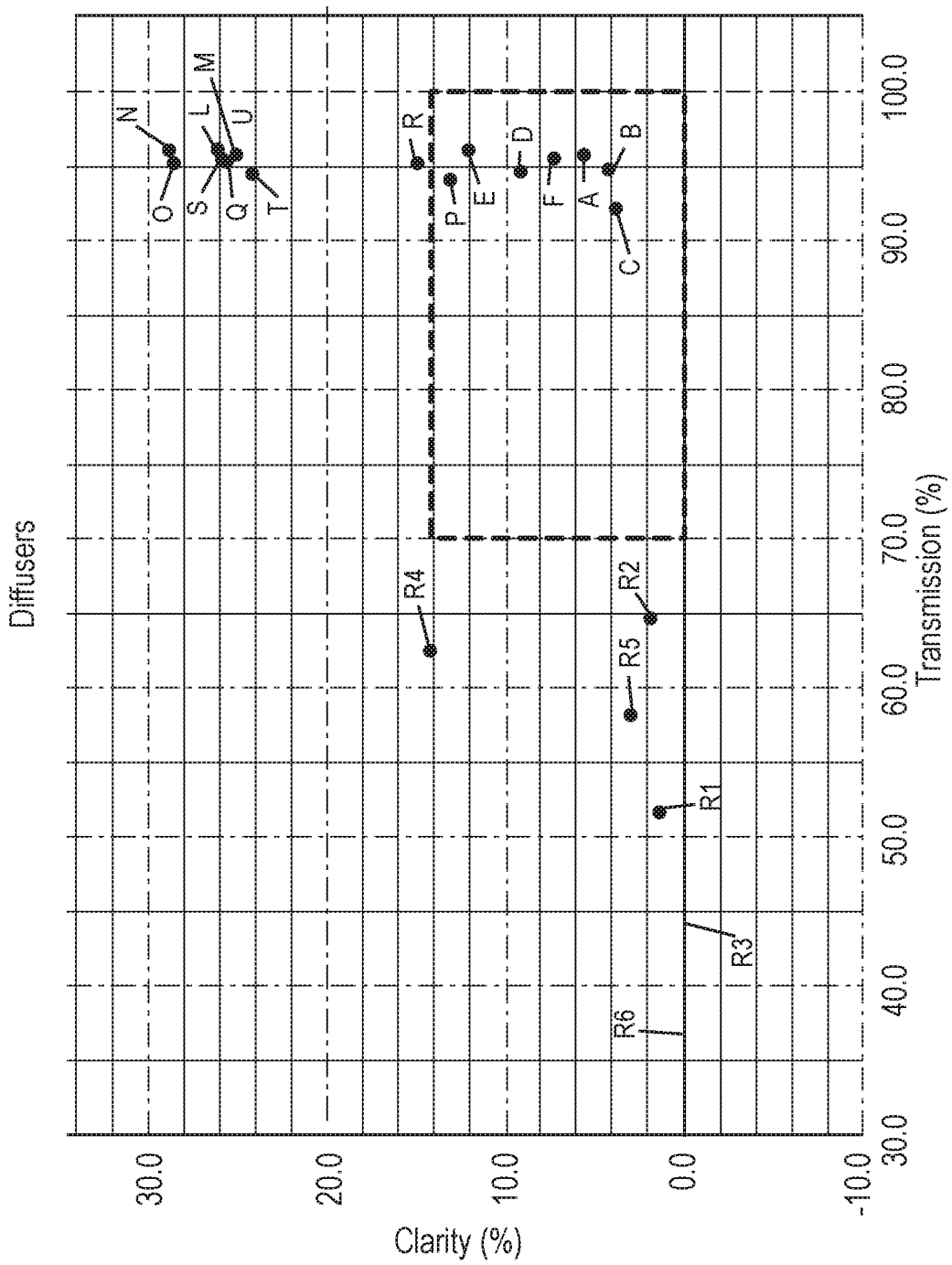
FIG. 7 shows percent (%) transmission and percent (%) clarity for the films made as described in Example 1 (see Table 5) and for commercially available comparative films (see Table 6B). The dashed lined encompasses samples having a percent transmission of at least 70 and a percent clarity of up to 14.2.

As further described in Example 2 and shown in FIG. 7 and Tables 3 and 5, the linear density needed to achieve a high transmission (that is, percent transmission greater than 70), a low clarity (that is, a percent clarity of up to 14.2), and the ability to blur a fluorescent source depends on the size of the scattering element. For films wherein the scattering element is a silicone bead, films having a mean particle diameter of 2 μm and a linear density of at least 5.1 $W_i$*μm, a mean particle diameter of 3 μm and a linear density of at least 6 $W_i$*μm, a mean particle diameter of 4.1 μm or 4.4 μm and a linear density of at least 13 $W_i$*μm; or a mean particle diameter of 9.3 μm and a linear density of at least 15 $W_i$*μm exhibit both a high transmission (that is, percent transmission greater than 70), a low clarity (that is, a percent clarity of up to 14.2) and the ability to blur a fluorescent source.

As further described in Example 2, the relationship between linear density and bead size (for beads having a mean particle diameter of at least 2 μm and up to 9.3 μm) for films achieving the desired transmission and clarity can be determined and mathematically represented. Thus, in some embodiments, films exhibiting a relationship as described by the following equation exhibit both a high transmission (that is, percent transmission greater than 70), a low clarity (that is, percent clarity of up to 14.2), and the ability to blur a fluorescent source:

$$LD \geq 1.3562\left(\frac{w_i}{\mu m^2}\right)D_{Bead} + 2.3877\left(\frac{w_i}{\mu m}\right),$$

wherein "LD" is linear density, $W_i$ is the mass fraction of a silicone bead, $D_{Bead}$ is the mean particle diameter of the silicone bead, and $2 \leq D_{Bead} \leq 9.3$.

Similarly, the linear density needed to achieve a high transmission (that is, percent transmission greater than 70), a low clarity (that is, a percent clarity of up to 5.6) and the ability to blur a LED point light source, also depends on the size of the scattering element. As further described in Example 2, samples made using Tospearl beads having a diameter of up to 4 μm and a linear density of at least 6.6 $W_i$*μm exhibited a clarity of up to 5.6%, samples made using Tospearl beads having a diameter of up to 4.1 μm and a linear density of at least 8 $W_i$*μm exhibited a clarity of up to 5.6%.

Printable Surface and Ink Layers

As further described below, the films may be used as a bulk diffuser and/or as a print substrate.

The films include a major surface which, in some embodiments, includes or is an ink-receptive surface. Whether a film has an ink-receptive surface is determined per the Ink Adhesion Test, as described in the Examples.

In some embodiments, an ink layer is disposed directly on the ink-receptive surface of the film. In some embodiments, the ink layer may include at least two, or at least three layers of ink. For example, the ink layer may comprise a first layer of ink disposed directly on the ink-receptive surface of the film, a second layer of ink disposed on the first layer, and a third layer of ink disposed on the second layer. In some embodiments, the second layer of ink may include a white ink. In some embodiments, the first layer of ink or the third layer or both may include a non-white ink.

In some embodiments, when the ink layer is disposed on a major surface of the film, the ink layer may be viewed through the film (that is, from the unprinted surface of the film) without a substantial difference in the color from the color observed when the ink layer is not viewed through the film. In some embodiments, the ink layer may be disposed directly on an ink-receptive surface of the film. In some embodiments, the difference in the color observed from the printed side (or a first major surface) of the film and the unprinted side (or a second major surface) of the film may be measured using ASTM D2244-16, and the $\Delta E^*_{ab}$ may be up to 3, up to 2.5, up to 2, up to 1.9, up to 1.8, up to 1.7, up to 1.6, up to 1.5, up to 1.4, up to 1.3, up to 1.2, up to 1.1, up to 1, up to 0.9, or up to 0.8 for an ink layer. In some embodiments, the $\Delta E^*_{ab}$ is at least 0.1 at least 0.2, or at least 0.5. In some embodiments, the difference in the color observed from the printed side (or) of the film and the unprinted side (or second major surface) of the film may be measured using ASTM D2244-16, and the $\Delta E^*_{ab}$ may be up to 3, up to 2.5, up to 2, up to 1.9, up to 1.8, up to 1.7, up to 1.6, up to 1.5, up to 1.4, up to 1.3, up to 1.2, up to 1.1, up to 1, up to 0.9, or up to 0.8 for a particular ink color. In some embodiments, the $\Delta E^*_{ab}$ is at least 0.1 at least 0.2, or at least 0.5.

For example, in an exemplary embodiment, the difference in the color observed from the first major surface and the second major surface may be up to 3, more preferably up to 0.8 for cyan ink. In another exemplary embodiment, the difference in the color observed from the first major surface and the second major surface may be up to 3, more preferably up to 1.8 for magenta ink. In a further exemplary embodiment, the difference in the color observed from the first major surface and the second major surface may be up to 3, more preferably up to 1.1 for yellow ink. In yet another exemplary embodiment, the difference in the color observed from the first major surface and the second major surface may be up to 3, more preferably up to 1.4 for yellow ink.

In some embodiments, the film may be incorporated in a multilayer construction. For example, the film may be incorporated in a bi-layer, a tri-layer, or a quad-layer construction. In some embodiments, each layer of film in the multilayer construction may include an ink layer disposed on the ink receptive surface.

Methods of Making the Films

In another aspect this disclosure describes methods of making the films described herein.

The films may be made by any suitable method. In some embodiments, the film is a blown film. In some embodiments, the film is an extruded film. In some embodiments, the film is preferably a cast film coated from an organosol. In some embodiments, the films may be made by adding a scattering element to a polymer. In some embodiments, the polymer may be included in a clear base.

The scattering element and the polymer may be combined using a method that ensures blending. In some embodiments, the scattering element may be added to a polymer (or a clear base including the polymer) using a mixer including, for example, a Cowles blade mixer. The scattering element and polymer (or a clear base including the polymer) may be mixed until the composition appears homogenous. Additionally or alternatively, the mixture may be mixed for a set period of time including for example, up to 0.5 hours, up to 1 hour, up to 1.5 hours, or up to 2 hours. When the film is an extruded film or a blown film, the scattering elements may be mixed with the polymer as a second add to the extruder by itself or as a masterbatch.

The film may be formed by any suitable means that results in a film having the desired thickness. Exemplary film thicknesses are described above.

In some embodiments, the film may be formed on a substrate by coating. Coating may be accomplished by any suitable method including, for example, a notch bar process (also referred to as a comma or knife coating process), a gravure coater, a slot die coater, a reverse roll coater, a transfer roll coater, a modular coater, or a hot melt coater. In some embodiments, a notch bar may have a knife over roll configuration.

When a notch bar process is used, the notch gap may be set to achieve the desired finished film thickness. For example, the notch bar gap may be at least 5 μm, at least 10 μm, at least 50 μm, at least 100 μm, or at least 200 μm, and up to 10 μm, up to 50 μm, up to 100 μm, up to 200 μm, or up to 500 μm. In an exemplary embodiment, as further described in the Examples, the notch bar gap may be set to 4 mils (100 μm) so the finished film thickness is approximately 2 mils (50 μm).

The film may be formed at any suitable speed depending on the oven and drying configuration used. In some embodiments, the film may be formed by coating at a speed of at least 5 feet per minute (ft/min), at least 10 ft/min, at least 15 ft/min, or at least 20 ft/min. In some embodiments, the film may be formed by coating at up to 10 ft/min, up to 15 ft/min, up to 20 ft/min, up to 25 ft/min, up to 50 ft/min, up to 100 ft/min, up to 150 ft/min, up to 200 ft/min, up to 250 ft/min, up to 300 fit/min, up to 350 ft/min, up to 400 ft/min, up to 500 ft/min, up to 1,000 ft/min, or up to 1500 ft/min. In some embodiments, the film may be formed by coating at a speed in a range of 5 ft/min to 300 ft/min. In some embodiments, the film may be formed by coating at a speed in a range of 5 ft/min to 15 ft/min. In some embodiments, the film may be formed by coating at a speed of 10 ft/min.

In some embodiments, the substrate includes a casting liner. The casting liner may be selected depending on the features (for example, surface features) desired for the film. The casting liner may be selected based on its gloss, as a lower-gloss casting liner may introduce more surface diffusion effect into the bulk diffusion property of the final film. In some embodiments, films made with a higher gloss casting liner may have higher clarity than films made with a lower gloss casting liner. In some embodiments, a casting liner may include a casting liner similar to or as described in Sarvetnick HA (1972) "Plastisols and Organosols" (Van Nostrand Reinhold Company: New York, N.Y.).

In some embodiments, the mixture of the scattering element and the polymer may be cured. Curing of the organosol may be accomplished by any suitable method. In some embodiments including, for example, for a casted diffuser film coated from an organosol, the coating may pass through a multi-zone continuous process oven. The zones may be configured to dry the solvents out of the organosol and fuse or sinter the polymer.

In an exemplary embodiment, as further described in the Examples, the oven temperatures ranges for the three zones of a multi-zone continuous process oven were: 149° F. (65° C.) to 155° F. (68° C.) {zone 1}, 243° F. (117° C.) to 251° F. (122° C.) {zone 2}, and 369° F. (187° C.) to 371° F. (188° C.) {zone 3}.

In some embodiments, a method of making a film described herein includes removing the substrate. For example, a casting liner may be removed from the film.

In some embodiments, it may be desirable to join the film to a different substrate than the film was formed on. In such embodiments, the film may be joined to the substrate by any suitable means. Exemplary methods of joining the film onto a substrate include lamination of diffusing film to substrate and/or adhering the film layer to a substrate via an adhesive (for example, a heat activated adhesive, a hot melt adhesive, or a pressure sensitive adhesive). In some cases, including, for example, when the polymer includes PVC, hot lamination may be used to bond the materials together without the use of an adhesive.

In some embodiments, it may be desirable to join the film to a strength reinforcing fabric or a scrim. An exemplary method of joining the film onto a strength reinforcing fabric includes adhering the film layer to the strength reinforcing fabric via an adhesive (for example, a heat activated adhesive, a hot melt adhesive, or a pressure sensitive adhesive).

Methods of Using the Films

The films described herein may be used for any suitable purpose. Exemplary uses, further described below include as a bulk diffuser, as a substrate for printing, and in a sign including, for example in a backlit illuminated sign. As further described below, the uses are not exclusive. For example, a film (printed or un-printed) may be used as a bulk diffuser in a backlit illuminated sign.

Bulk Diffusers

In some embodiments, a film described herein may be used for evenly distributing light including, for example as a bulk diffuser.

In some embodiments, including when the film is used as a bulk diffuser, the film may be used in combination with a point light source, such as a light emitting diode (LED), an organic light emitting diode (OLED), a laser, a high intensity discharge (HID) bulb, or an incandescent light source. In some embodiments, a point light source has an extent of up to 5 mm or up to 10 mm. As used herein, "extent" refers to the geometric extent of the light source, that is, the cross-sectional area for typical light sources used in backlit illuminated signs. Light sources such as fluorescent bulbs and LEDs used in backlit signage are not typically columnated.

In some embodiments it may also be advantageous to use the film in combination with an extended light source, such as a fluorescent (tube) bulb. In some embodiments, an extended light source has an extent of at least 0.75 inches (19 mm).

In some embodiments when the film is used as a bulk diffuser, the film may be combined with a surface diffuser. A separate surface diffuser and/or the surface diffusion properties of the film may be selected depending on the features desired for the film. For example, as further discussed herein, the gloss of a casting liner on which the film is formed may be modified to alter surface diffusion effect.

Sign Substrate

In some embodiments, a film described herein may be used as a sign substrate.

In some embodiments, the sign substrate may be a rigid sign substrate. Typically, a rigid sign substrate will be up to 1 inch (25.4 mm) thick. Such a rigid sign substrate may also be durable, wind resistant, or dimensionally stable, or a combination thereof.

In some embodiments, the sign substrate may be a flexible sign substrate. Typically, a rigid sign substrate will be in the range of 6 mils (0.15 mm) to 30 mils thick (0.76 mm) thick. In some embodiments, when the film is used as a flexible sign substrate, the film may be joined to a strength reinforcing fabric.

Substrate for Printing

In some embodiments, a film described herein may be used as a substrate for printing. For example, an ink layer or ink layers may be applied by printing.

In some embodiments, printing of the films provides an opportunity for sign designers and fabricators to increase whiteness index of the film substrate to improve printed image quality, while at the same time increasing surface diffusion with printed structure on surface, thus providing sufficiently low clarity for hiding lighting hot spots. For example, printing (including, for example, printing a white ink) on an undecorated area between colored-ink graphics of a sign (see FIG. 1) may provide apparent whiteness for daytime reflection while, for inks that also decrease clarity, such as UV ink, improving blurring of a light source.

In some embodiments, when the film is used as a substrate for printing, the film and the ink layer may be further combined with an adhesive and a clear substrate. Examples of such embodiments (where the film is used as a substrate for printing) are shown in FIG. 3A and FIG. 4A-FIG. 4D. Additionally or alternatively, the film may be combined with an ink layer printed on a clear substrate, as shown in any exemplary embodiment in FIG. 3B.

Figure 2A:
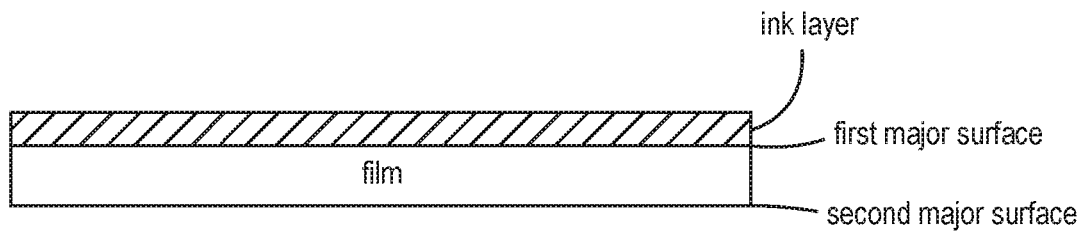
FIG. 2A-FIG. 2E show exemplary constructions in which a film as described herein is used as a substrate for printing.
Figure 2B:
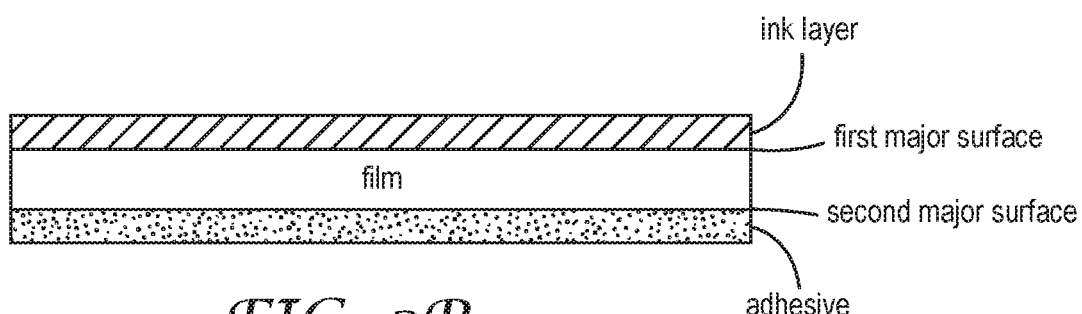
Figure 2C:
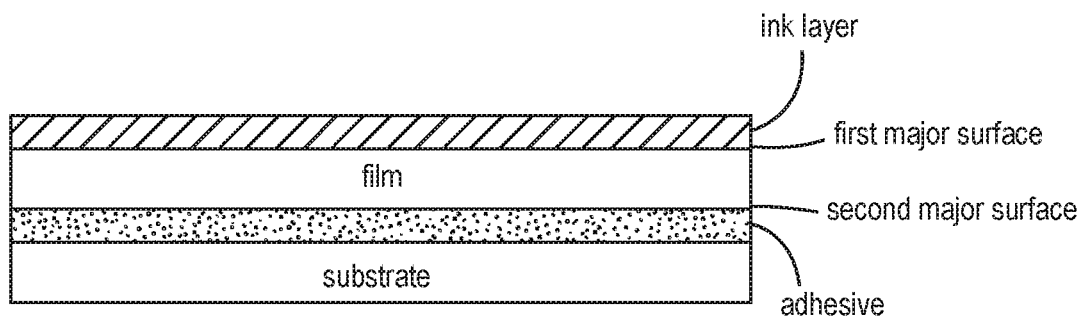
Figure 2D:
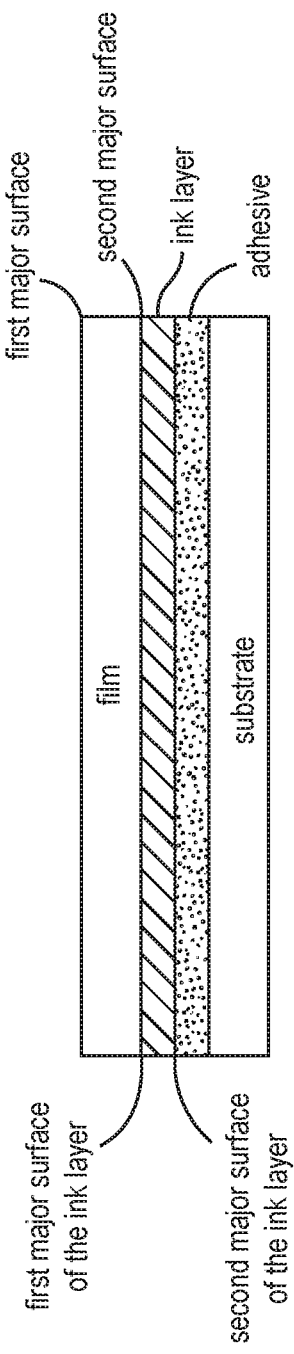

For example, following imposition of the ink layer on one major surface of a film (see FIG. 2A) (including, for example, by printing), an adhesive may be applied to the ink layer (FIG. 2D) or the opposite major surface of the film (see FIG. 2B). The adhesive may include any suitable adhesive that sufficiently bonds to the diffuser film, including but not limited to, a pressure sensitive adhesive (PSA), a hot melt adhesive, or a heat-activated adhesive, or a combination thereof. In some embodiments, the adhesive is preferably a nominally clear adhesive substrate. In some embodiments, the adhesive may include a diffusing element. The adhesive may be applied to a surface of a substrate with elevated temperature and/or pressure (see FIG. 2C and FIG. 2D). In such embodiments, the adhesive may be selected for its ability to bind to a particular substrate. In some embodiments, the substrate may be a hard clear substrate (for example a window and/or clear glass). In other embodiments, the substrate may be an acrylic, polycarbonate, or PETG substrate typically used in the back lit sign industry.

In additional embodiments, the substrate may be a transparent or translucent flexible substrate such as 3M Panagraphics™ III. As further described in Example 5 and shown in FIG. 10, the films described herein allow for the clear appearance of an ink layer when it is located behind the film (that is, the film is located between the viewer and the ink layer), as shown in some exemplary embodiments in FIG. 4B and FIG. 4D.

It should further be understood that the films described herein may be used as applied surfaces. For example, the films may be included with other films in layers, including as an overlaminate to protect a film substrate or a printed image or both.

Backlit Illuminated Signs and Sign Boxes

In some embodiments, the films described herein may be used in the construction of a sign including, for example, as part of a backlit illuminated sign and/or a sign box.

A backlit illuminated sign and/or a sign box includes an ink layer, a light source, and a substrate. In some embodiments, the substrate may include a clear substrate; additionally or alternatively, the substrate may include a diffusive substrate.

A backlit illuminated sign may further include an adhesive. The adhesive may be included in or may form an adhesive layer. The adhesive may be located between the substrate and the film. The adhesive may include any suitable adhesive including, for example, a pressure sensitive adhesive.

Figure 3A:
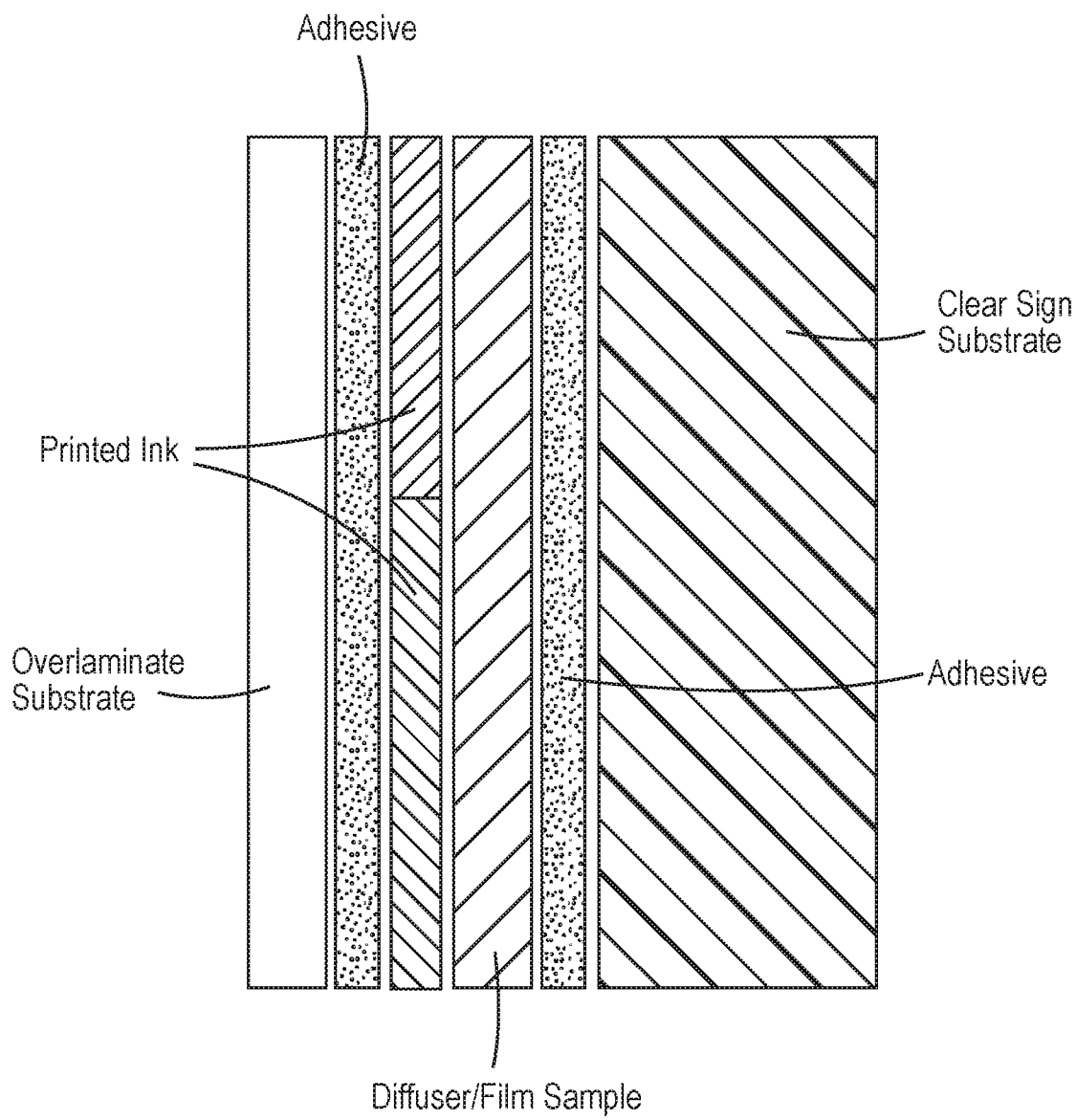
FIG. 3A shows an exemplary construction in which a film as described herein is used in a sign.
Figure 3B:
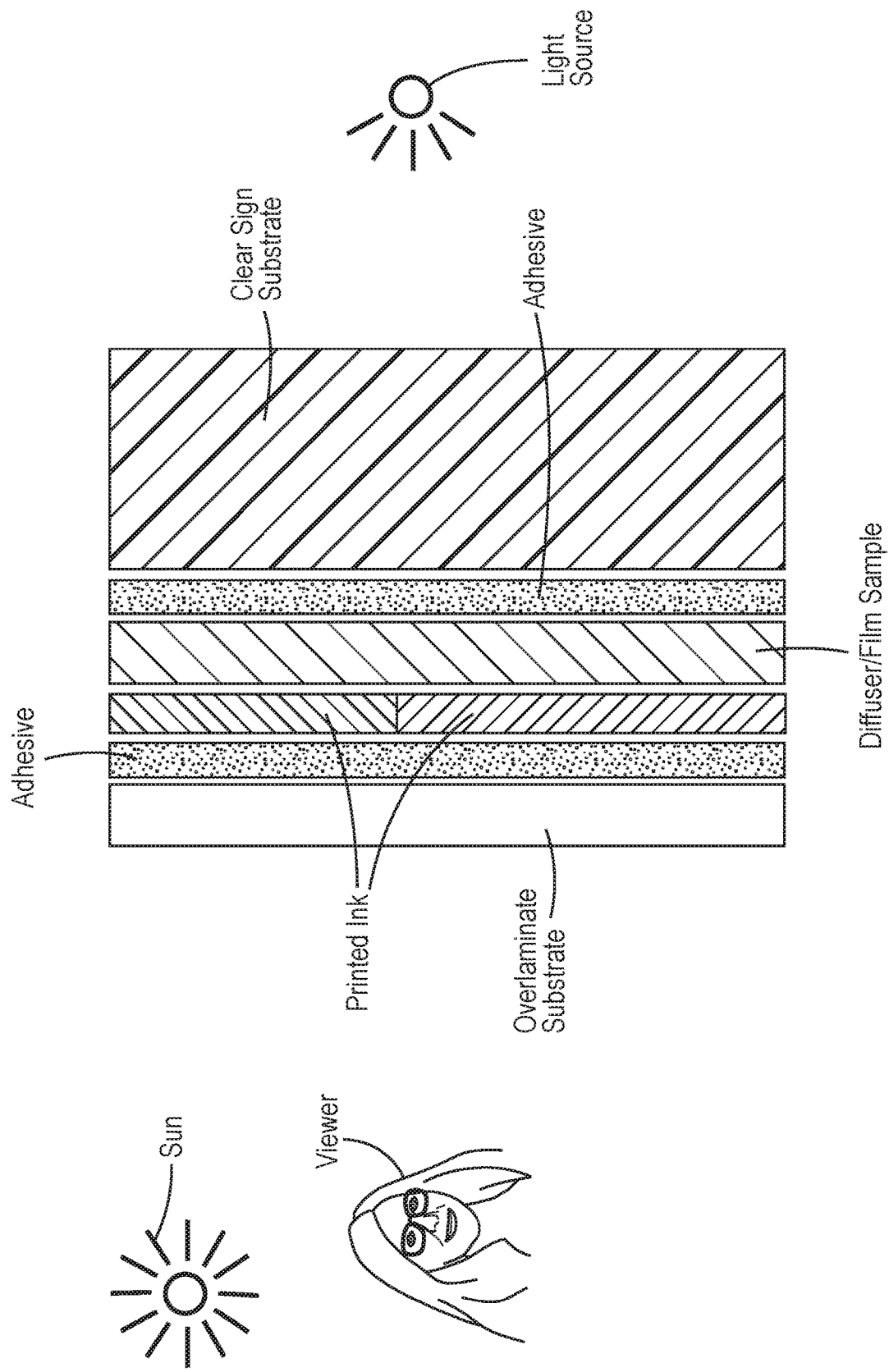
FIG. 3B shows an exemplary construction in which a film as described herein is used in a backlit sign.
Figure 3C:
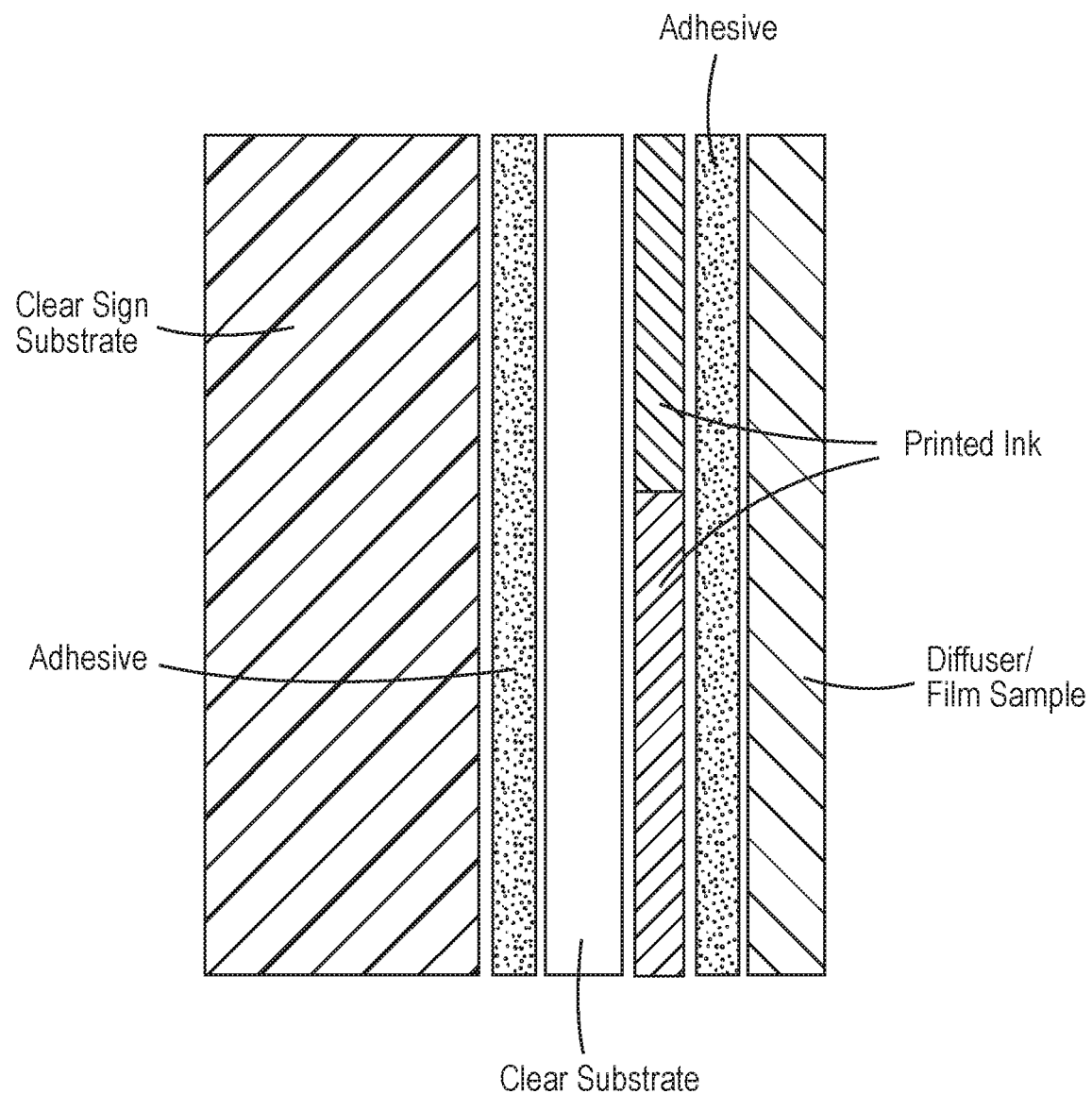
FIG. 3C shows an exemplary construction in which a film as described herein is used in a sign.
Figure 3D:
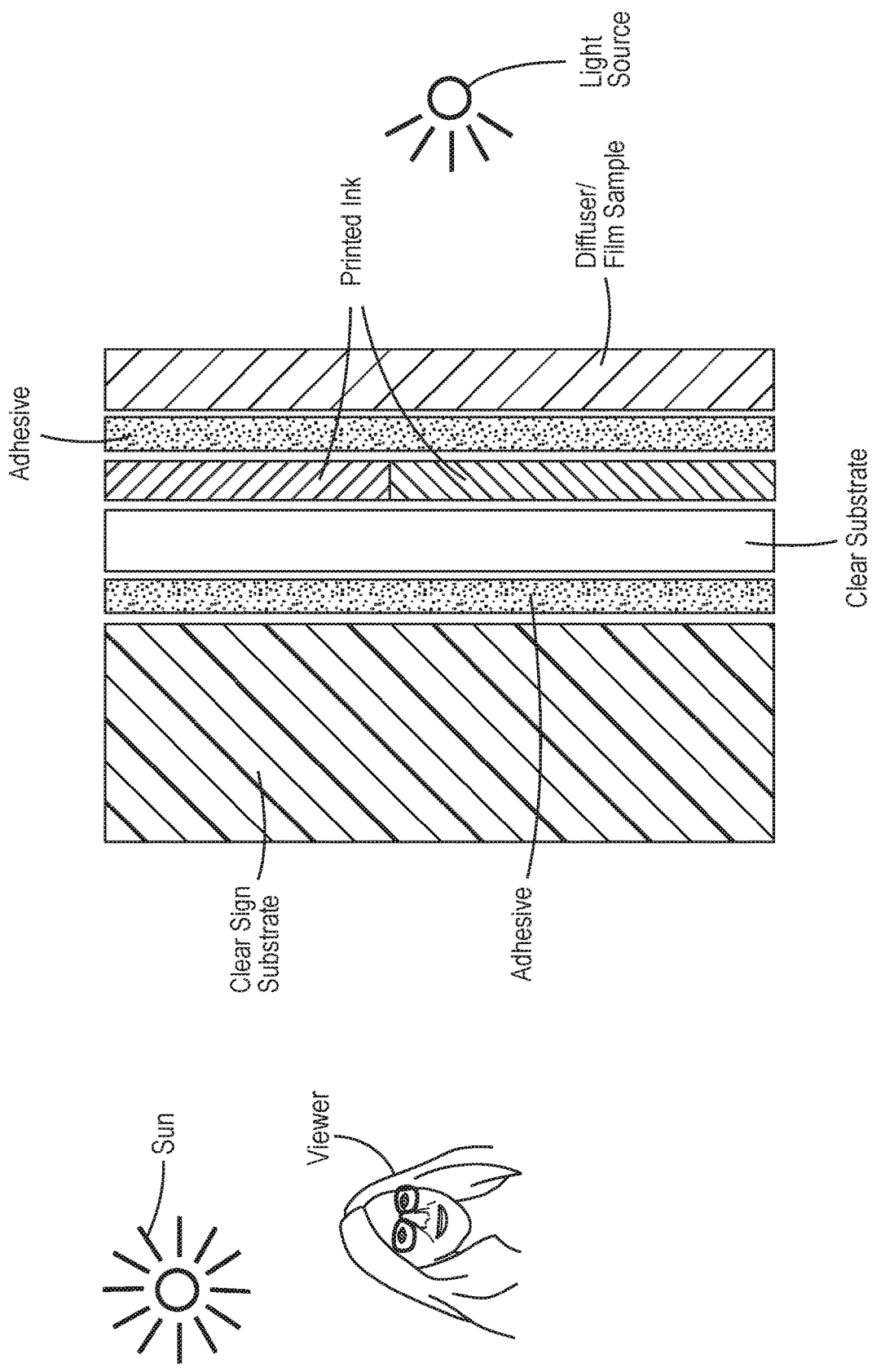
FIG. 3D shows an exemplary construction in which a film as described herein is used in a backlit sign.

As further described in Example 5, the films described herein allow for the clear appearance of an ink layer when a diffuser film is located between the ink layer and the viewer, that is, when the ink layer is facing the light source. This property allows for more efficient sign construction. Typically, at the time of the invention, the ink layer would be located between the diffuser film and the viewer. For example, as shown in FIG. 3A, the ink layer of a lit sign could be printed on the major surface of a diffuser film facing away from a light source. Alternatively, as shown in FIG. 3C, the ink layer could be printed on a substrate other than the film, for example, a clear substrate. These constructions were preferred at the time of the invention because the construction protects the ink layer while preventing the image from appearing washed out because a diffuser film is not located between the viewer and the ink layer. As shown in an exemplary embodiment in FIG. 3A, such a printed image is typically protected from the ambient environment (including UV-exposure, scratching, dust/oil/chemical cleaning) with an overlaminate.

Figure 4A:
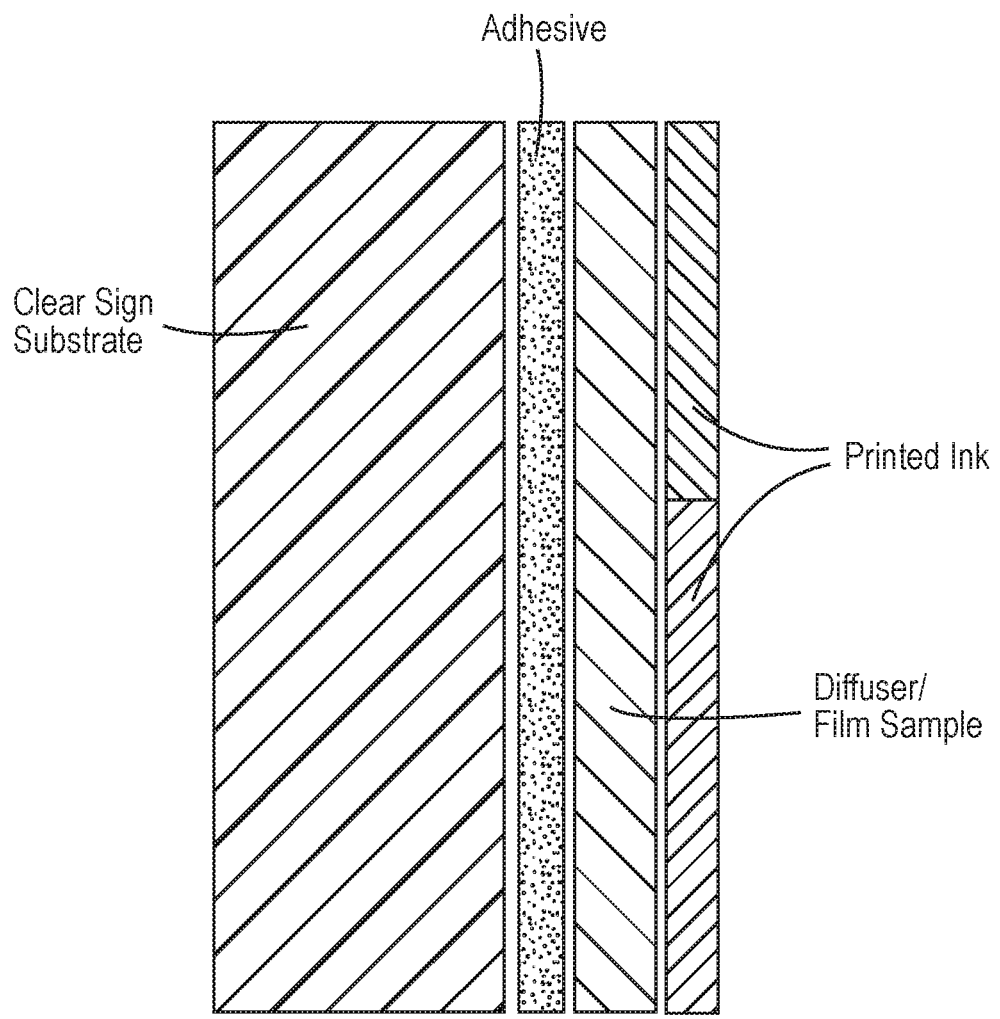
FIG. 4A shows an exemplary construction in which a film as described herein used as a substrate for printing is incorporated in a sign.
Figure 4B:
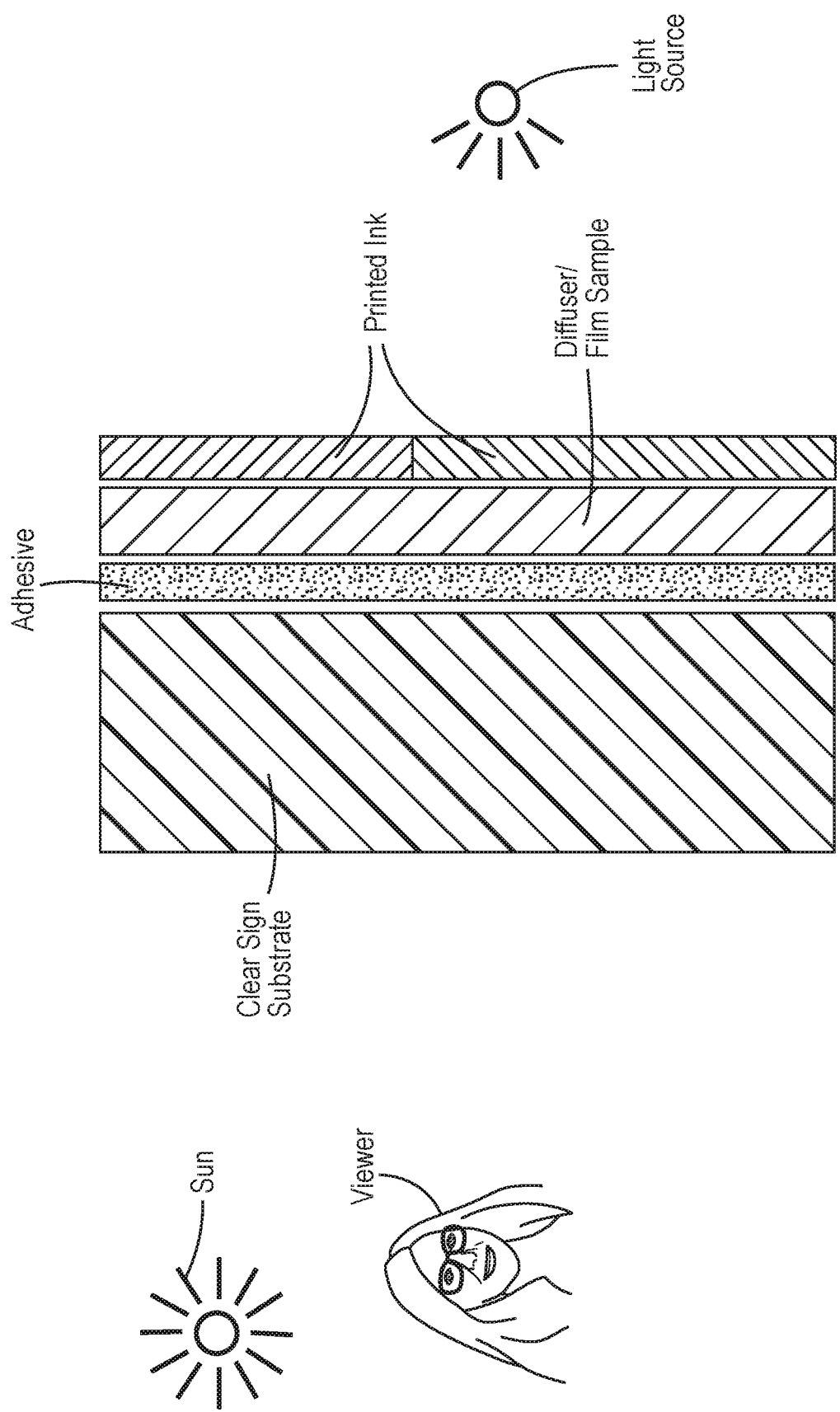
FIG. 4B shows an exemplary construction in which a film as described herein used as a substrate for printing is incorporated in a backlit sign.
Figure 4C:
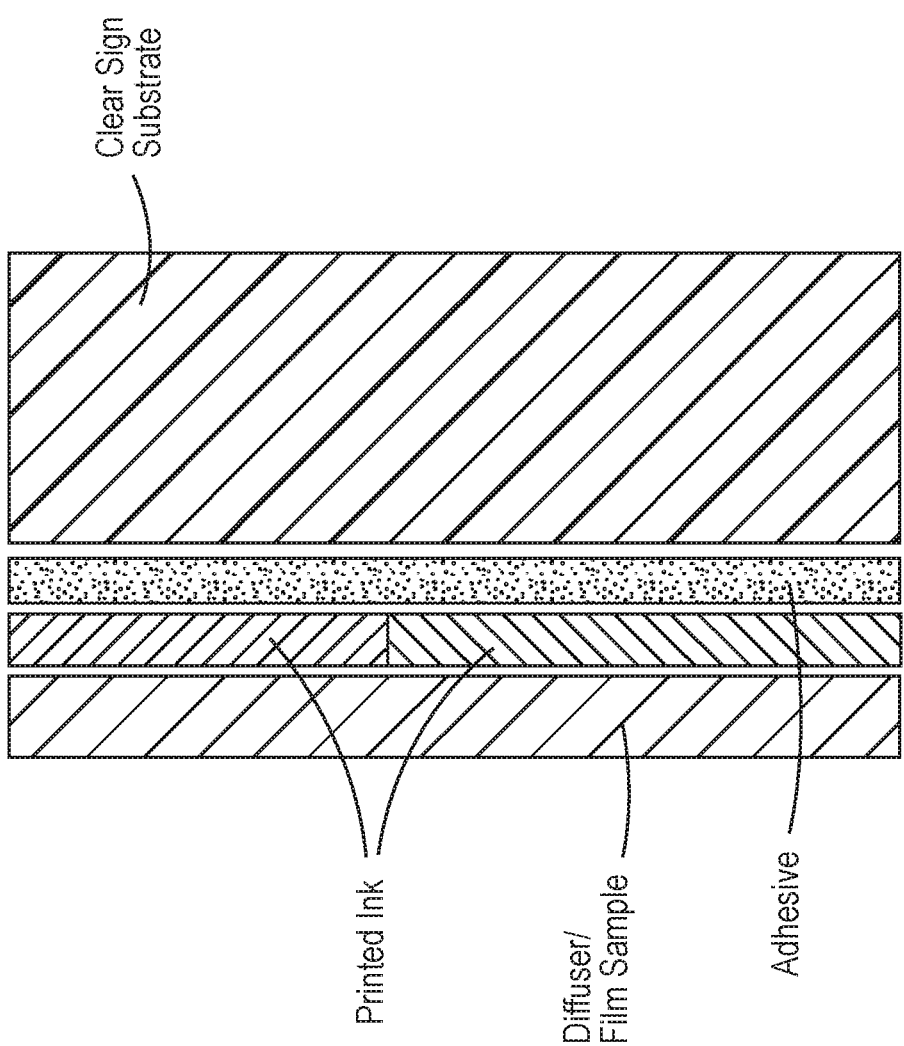
FIG. 4C shows an exemplary construction in which a film as described herein used as a substrate for printing is incorporated in a sign.

In contrast, because of the clear appearance of an ink layer when it is disposed behind a film described herein, an ink layer on the films described herein can be protected from the ambient environment by locating the diffuser film between the ink layer and the viewer and/or by facing the ink layer toward a light source, allowing for a film construction such as the ones shown in FIG. 4A and FIG. 4C and a sign construction as shown in FIGS. 4B and 4C.

Figure 2E:
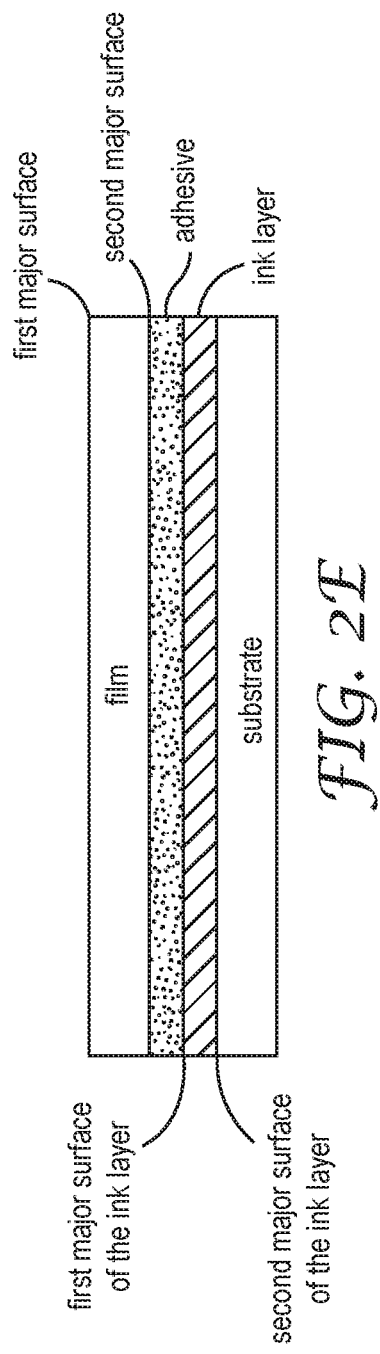

To take advantage of the clear appearance of the ink layer when it is located behind the film, it will be apparent, however, that the film need not necessarily be used as a substrate for printing. For example, the ink layer may be printed on a major surface of a substrate (or a colored translucent film may be located proximate to the major surface of the substrate), and an adhesive may be used to bond the ink layer or the colored translucent film and the film, as shown in an exemplary embodiment in FIG. 2E.

By allowing for constructions that locate a diffuser film between the ink layer and the viewer, the number of total layers required in the sign may be decreased, the thickness of the sign may be decreased, and improved image durability may be achieved. For example, such a construction may allow for the elimination of the overlaminate, facilitating a lower cost sign.

Figure 4D:
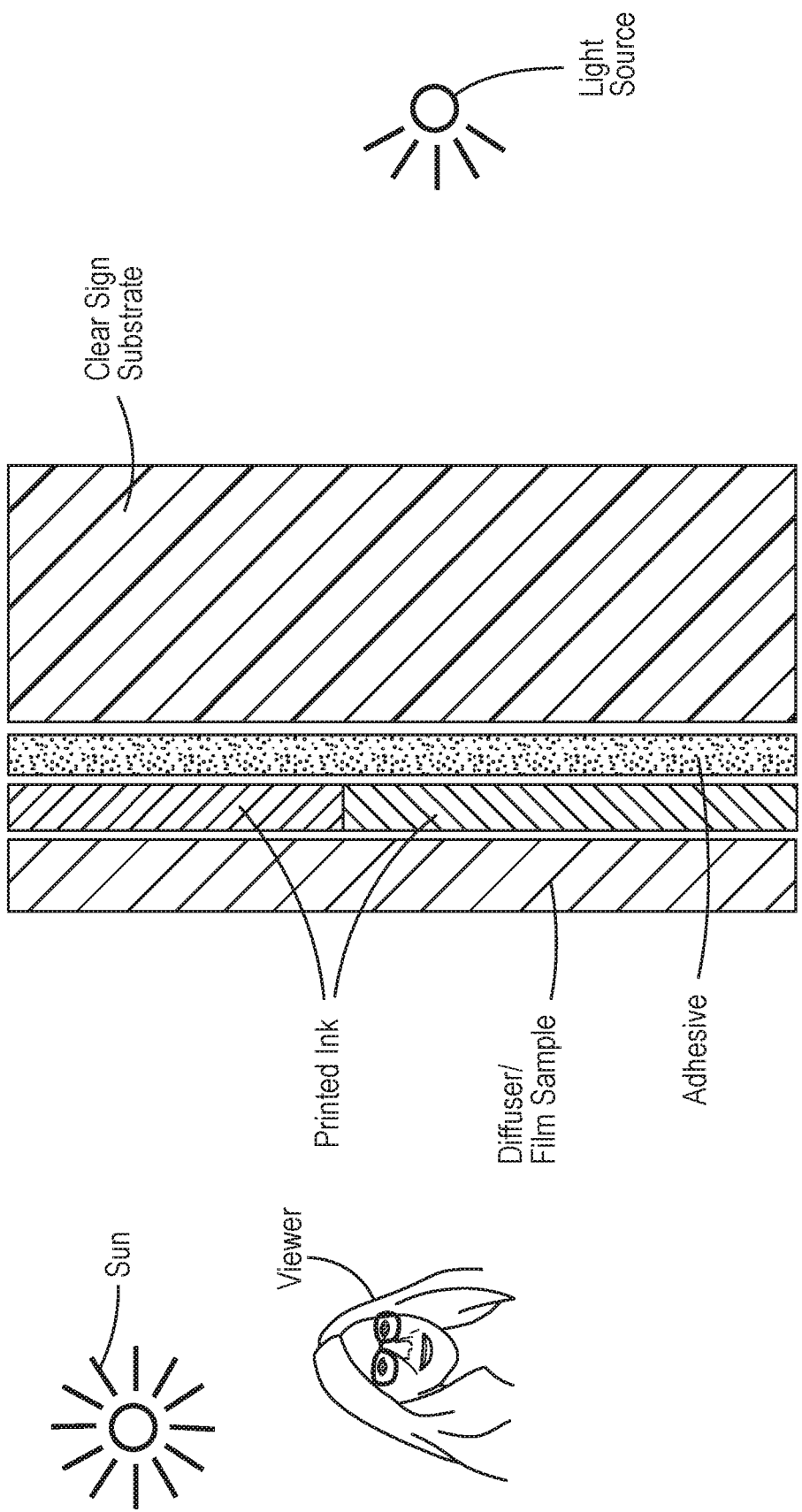
FIG. 4D shows an exemplary construction in which a film as described herein used as a substrate for printing is incorporated in a backlit sign.
Figure 4E:
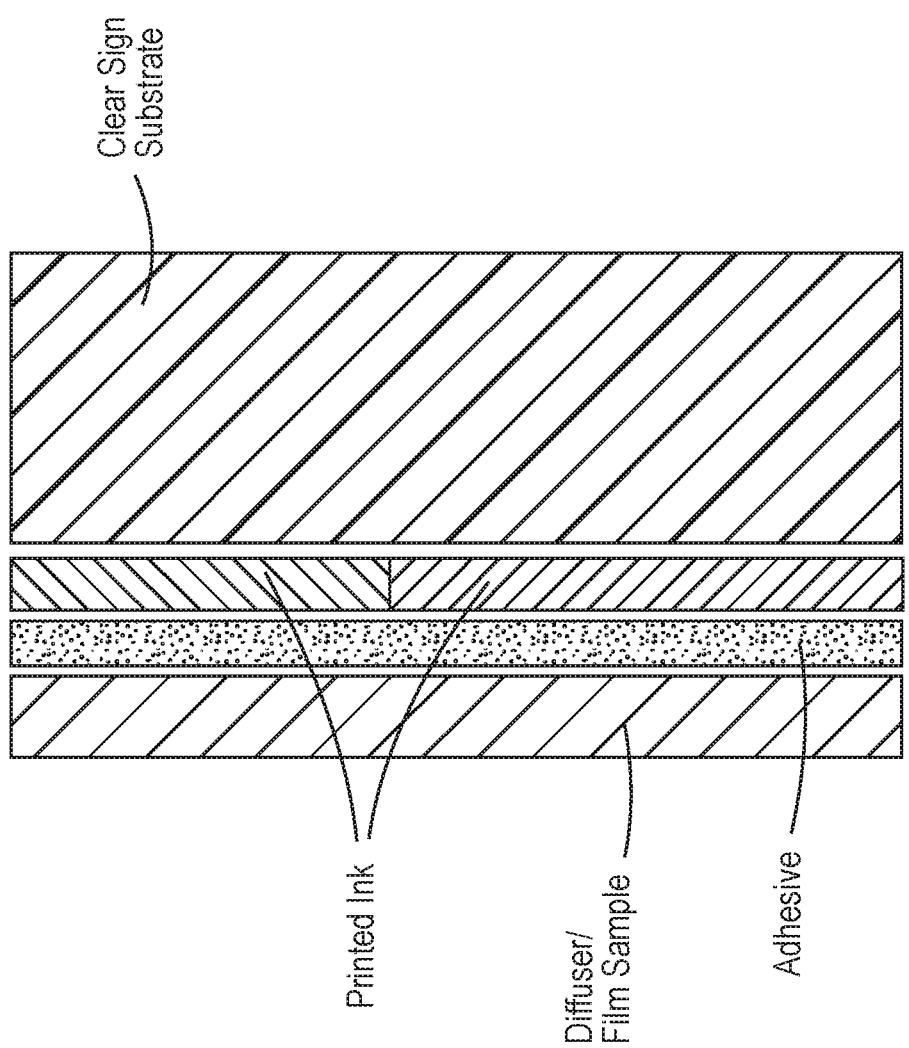
FIG. 4E shows an exemplary construction in which a film as described herein used is adhered to an ink layer and incorporated in a sign.
Figure 4F:
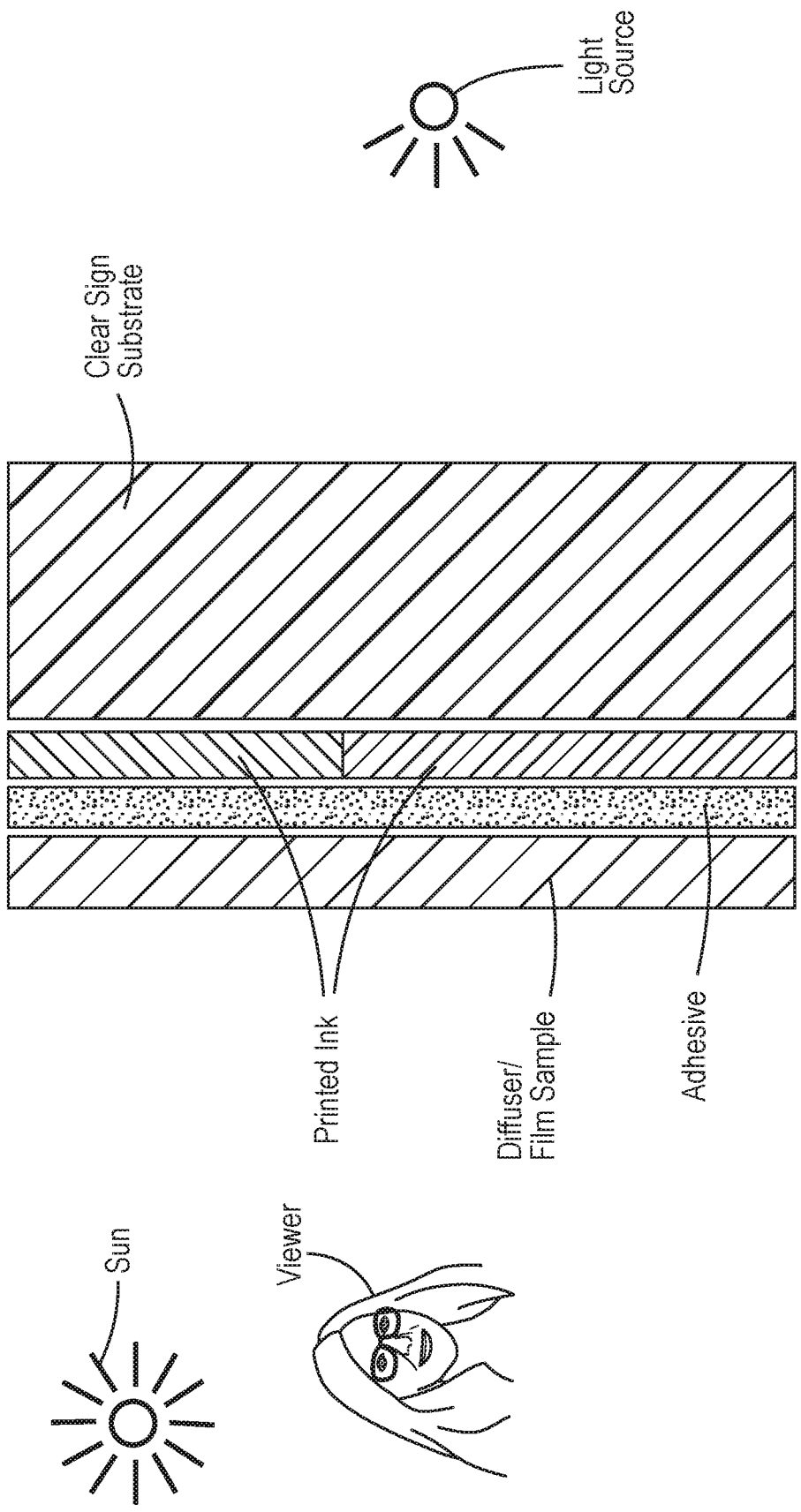
FIG. 4F shows an exemplary construction in which a film as described herein is adhered to an ink layer and is incorporated in a backlit sign.

Thus, in some embodiments, a sign box may include a substrate, an adhesive, and the film. An ink layer may be located proximate to a first major surface of the film (FIG. 4A-FIG. 4B & FIG. 2A). The adhesive may be located proximate to a second major surface the film and a major surface of the substrate (FIG. 4A-FIG. 4B & FIG. 2B-FIG. 2C). Alternatively, the adhesive may be located proximate to the ink layer (FIG. 4C-FIG. 4F & FIG. 2D-FIG. 2E). In some embodiments, the sign box may further include a light source, and the ink layer will be located between the film and the light source (FIG. 4B, FIG. 4D, or FIG. 4F). In such embodiments, the difference in the color observed from the printed side (or) of the film and the unprinted side (or second major surface) of the film may be minimal. For example, the $\Delta E^*_{ab}$ for the printed film may be preferably be in a range of 0.1 to 3.

Additionally or alternatively, instead of or in addition to including an ink layer, the ink layer may be replaced or supplemented with a colored translucent film such as 3M™ Scotchcal™ Translucent Graphic Film Series 3630 or 3M™ Envision™ Translucent Film Series 3730 in a similar construction.

Additional Uses

Additional uses for the films and bulk diffusers described herein can also be envisioned. For example, the films may be used in the light industry, including in luminaires. In some embodiments, the films could be used in medical equipment including, for example, on dental operatory lights, surgical lights, or exam lights. The films may also be used in toys or lighted handheld devices.

Exemplary Bulk Diffuser Embodiments

1. A composition comprising
    a bulk diffuser comprising a film having a major surface, the film comprising
        a polymer, and
        a scattering element, wherein the scattering element comprises a silicone bead having a mean particle diameter in a range of 2 micrometers (μm) to 9 μm;
            wherein if the silicone bead has a mean particle diameter of 2 μm, the linear density of the film is at least 5.1 $W_i^*$μm,
            wherein if the silicone bead has a mean particle diameter of 3 μm, the linear density of the film is at least 6 $W_i^*$μm,
            wherein if the silicone bead has a mean particle diameter of 4.1 μm or 4.4 μm, the linear density of the film is at least 13 $W_i^*$μm, or
            wherein if the silicone bead has a mean particle diameter of 9.3 μm, the linear density of the film is at least 15 $W_i^*$μm.
        wherein the linear density equals the product of the mass fraction of the scattering element ($W_i$) and film thickness in micrometers (μm).

2. The composition of Embodiment 1,
wherein if the silicone bead has a mean particle diameter of up to 4 µm, the linear density of the film is at least 6.6 $W_i$*µm, and
wherein if the silicone bead has a mean particle diameter of 4.1 µm, the linear density of the film is at least 8 $W_i$*µm.

3. A composition comprising
a bulk diffuser comprising a film having a major surface, the film comprising
a polymer, and
a scattering element, wherein the scattering element comprises a silicone bead having a mean particle diameter in a range of 2 micrometers (µm) to 9.3 µm;
wherein the linear density of the film is at least $$1.3562\left(\frac{W_i}{\mu m^2}\right)D_{Bead} + 2.3877\left(\frac{W_i}{\mu m}\right),$$

wherein $W_i$ is the mass fraction of a silicone bead, $D_{Bead}$ is the mean particle diameter of the silicone bead, and $2 \leq D_{Bead} \leq 9.3$.

4. The composition of any one of the preceding Embodiments, wherein the mass fraction of the scattering element ($W_i$) does not exceed 0.64.

5. The composition of any one of the preceding Embodiments, wherein the major surface comprises an ink-receptive surface.

6. The composition of Embodiment 5, wherein the major surface comprises an ink-receptive surface, as determined using the Ink Adhesion Test as described in the Examples.

7. The composition of Embodiment 5 or 6, wherein an ink layer is disposed directly on the ink-receptive surface of the film.

8. The composition of Embodiment 7, wherein the ink layer comprises at least two, or at least three layers of ink.

9. The composition of Embodiment 7 or 8, wherein the ink layer comprises a first layer of ink disposed directly on the ink-receptive surface of the film, a second layer of ink disposed on the first layer, and a third layer of ink disposed on the second layer, and further wherein the second layer of ink comprises a white ink.

10. The composition of Embodiment 9, wherein at least one of the first layer of ink and the third layer of ink comprises a non-white ink.

11. The composition of any one of Embodiments 7 to 9, wherein the color difference, $\Delta E^*_{ab}$, between a printed first major surface of the film, wherein the ink layer is disposed directly on the ink-receptive surface of the film, and an unprinted second major surface of the film, is up to 3, up to 2.5, up to 2, up to 1.9, up to 1.8, up to 1.7, up to 1.6, up to 1.5, up to 1.4, up to 1.3, up to 1.2, up to 1.1, up to 1, up to 0.9, or up to 0.8 for the ink layer, wherein $\Delta E^*_{ab}$ is calculated in accordance with ASTM D2244-16.

12. The composition of any one of the preceding Embodiments, wherein the polymer comprises polyvinyl chloride (PVC), polyurethane, or poly lactic acid (PLA), or a combination thereof.

13. The composition of any one of the preceding Embodiments, wherein the scattering element comprises a spherical silicone bead.

14. The composition of any one of the preceding Embodiments, wherein the film further comprises a diffusing pigment.

15. The composition of any one of the preceding Embodiments, wherein the scattering element comprises methyl silsesquioxane.

16. The composition of any one of the preceding Embodiments, wherein the film comprises a cast film.

17. The composition of any one of the preceding Embodiments, wherein the film exhibits a percent transmission (% T) of at least 70, at least 75, at least 80, at least 85, or at least 90.

18. The composition of any one of the preceding Embodiments, wherein the film exhibits a percent clarity of up to 5.6, up to 6, up to 7, up to 8, up to 9, up to 10, up to 11, up to 12, up to 13, up to 14, or up to 14.2.

19. The composition of any one of the preceding Embodiments, wherein the film exhibits a percent haze of at least 95, at least 96, at least 97, at least 98, or at least 99.

20. The composition of any one of the preceding Embodiments, wherein the film exhibits a percent transmission (% T) of at least 95.

21. The composition of any one of the preceding Embodiments, wherein the composition further comprises a colored translucent film.

22. The composition of any one of the preceding Embodiments, wherein the composition further comprises an adhesive layer.

23. The composition of any one of the preceding Embodiments, wherein the film comprises multiple layers,
wherein at least one layer comprises the scattering element, and
wherein the film thickness comprises the thickness each layer comprising the scattering element, and further wherein the film thickness is weighted to adjust for the weighted average of the scattering element within each layer comprising the scattering element.

24. A method of making the composition of any one of the preceding Embodiments, wherein the method comprises mixing the polymer and the scattering element and forming a film.

25. The method of Embodiment 24, wherein the method comprising
forming a clear base comprising the polymer and a solvent, a heat stabilizer, a UV stabilizer, a flow agent and/or a plasticizer, and
mixing the clear base and the scattering element.

Exemplary Sign Box Embodiments

1. A sign box comprising a substrate, an adhesive, and the composition of any one of Embodiments 1 to 23 of the Exemplary Bulk Diffuser Embodiments, wherein the adhesive is located between a major surface of the substrate and a second major surface of the film, and
wherein an ink layer or a colored translucent film is located proximate to the first major surface of the film,
wherein an ink layer or a colored translucent film is located between the adhesive and the second major surface of the film, or
wherein an ink layer or a colored translucent film is located between the adhesive and the major surface of the substrate.

2. The sign box of Embodiment 1, wherein an adhesive layer comprises the adhesive.

3. The sign box of Embodiment 1 or 2, wherein an ink layer is located proximate to the first major surface of the film, wherein the ink layer has a first major surface and a second major surface, and wherein the first major surface of the ink layer faces the first major surface of the film and the second major surface of the ink layer faces a light source.

4. The sign box of Embodiment 1 or 2, wherein a colored translucent film is located proximate to the first major surface of the film, wherein the colored translucent film has a first major surface and a second major surface, and wherein the first major surface of the colored translucent film faces the first major surface of the film and the second major surface of the colored translucent film faces a light source.

5. The sign box of Embodiment 1 or 2, wherein an ink layer is located between the adhesive and the second major surface of the film, wherein the ink layer has a first major surface and a second major surface, wherein the first major surface of the ink layer faces the second major surface of the film and the second major surface of the ink layer faces a light source.

6. The sign box of Embodiment 1 or 2, wherein a colored translucent film is located between the adhesive and the second major surface of the film, wherein the colored translucent film has a first major surface and a second major surface, wherein the first major surface of the colored translucent film faces the second major surface of the film and the second major surface of the colored translucent film faces a light source.

7. The sign box of Embodiment 1 or 2, wherein an ink layer is located proximate to the major surface of the substrate, and an adhesive is located between the ink layer and the second major surface of the film, wherein the ink layer has a first major surface and a second major surface, and wherein the first major surface of the ink layer faces the adhesive and the second major surface of the ink layer faces a light source.

8. The sign box of Embodiment 1 or 2, wherein a colored translucent film is located proximate to the major surface of the substrate, and an adhesive is located between the colored translucent film and the second major surface of the film, wherein the colored translucent film has a first major surface and a second major surface, and wherein the first major surface of the colored translucent film faces the first major surface of the film and the second major surface of the colored translucent film faces a light source.

9. The sign box of any one of the preceding embodiments, wherein the substrate comprises a clear substrate.

10. The sign box of any one of the preceding embodiments, wherein the adhesive comprises a pressure sensitive adhesive (PSA), a hot melt adhesive, or a heat-activated adhesive, or a combination thereof.

The present invention is illustrated by the following examples. It is to be understood that the particular examples, materials, amounts, and procedures are to be interpreted broadly in accordance with the scope and spirit of the invention as set forth herein.

EXAMPLES

Sample Preparation Methods

Film samples were produced by the addition of particles to a clear base organosol then coating by a notch bar process (also referred to as a comma coating or knife coating process).

The clear base organosol was prepared as described in U.S. Pat. No. 5,874,158, Example 5, except the component qualities were modified to the following weight percentages: Polyvinyl Chloride 47.5%, Polyester plasticizer 17.6%, Methyl methacrylate 7.6%, IV stabilizer 2.4%, Barium-Zinc Stabilizer 1.9%, Mineral Spirits 4.3%, Xylol 10.6%, and Di-isobutyl ketone 8.1%.

Spherical silicone beads (Tospearl®, Momentive Performance Materials (Waterford, NY)) were added to the clear base and blended with a Cowles blade mixer for approximately one minute or until the mixture appeared homogenous and no obvious particles remained. Resulting mixtures were roll mixed continuously for approximately 0.5 hour to 1 hour prior to coating to ensure blending and prevent settling. Bead size ranged from about 1 µm to about 10 µm in diameter in with an index of refraction of 1.4. A list of Tospearl® beads used can be found in Table 1 with their respective properties.

Organosol mixtures were coated with a film coating machine equipped with a notch bar (knife over roll configuration) on a substrate or casting liner similar to those described in Sarvetnick HA (1972) "Plastisols and Organosols" (Van Nostrand Reinhold Company: New York, N.Y.). The configuration included a casting liner, 12 inch wide notch bar, and a 3-zone continuous process oven. The organosol mixtures were coated at 10 feet per minute. The three oven zone lengths were 12 feet {zone 1}, 12 feet {zone 2}, and 24 feet long {zone 3}. The zones were configured to dry the solvents out of the organosol and fuse the PVC. The oven temperature ranges for the three zones were: 149° F. (65° C.) to 155° F. (68° C.) {zone 1}, 243° F. (117° C.) to 251° F. (122° C.) {zone 2}, and 369° F. (187° C.) to 371° F. (188° C.) {zone 3}. Films described in the following Examples were coated on a casting liner having a gloss as described in as described in Table 2. The notch gap was set to approximately 4 mils (100 µm) so the finished film thickness was approximately 2 mils (50 µm). Actual film thickness was measured with a micrometer and was recorded.

The casting liner was removed prior to use or measurement and evaluation of the films.

Measurement and Evaluation Methods

Transmission, Haze, and Clarity Test Methods

Percent transmission, percent haze, and percent clarity of sample films were measured consistent with ASTM D1003-13 using CIE Illuminant C. A Haze-Gard Plus, Model 4725 (BYK Additive and Instruments, Wesel, Germany) was used for all measurements.

Gloss Test

Gloss of sample films were measured consistent to ASTM D523-14 (2018). Film samples were backed with a 0.118 inch (3.0 mm) thick piece of rigid VIVAK PETG (Plaskolite, Columbus, Ohio) to ensure the film layer flat during the measurement. Gloss was measured using a Model 4446 (BYK Additive and Instruments, Wesel, Germany) gloss meter.

LED Blur Assessment Test

To assess the ability of a diffuser film to blur a point light sources (for example, an LED) in a light box, a viewing lightbox was assembled by which an observer can determine if the diffuser sufficiently hides individual light sources (for example, an LED) while directly viewing the light sources through the diffuser.

5 Sloan LED packages each with 3 LEDs pitched at 1 inch (25 mm) apart (#701269-WVLS-MB, 12vdc white, Sloan-LED, Ventura, Calif.) were arranged on a flat board such that all individual LEDs were spaced 1 inch (25 mm) horizontally and 1 inch (25 mm) vertically apart forming a 3×5 (15 total LEDs) array. This array, representing the backside of a sign box, was then attached to a manually adjustable slide that allowed the LEDs to be brought closer to or farther away from the front diffusing elements under study. The sides of the light box where painted black to fully assess the source light without random light mixing due to reflections in the box. Considering the pitch of 1 inch (25 mm), it was determined that the distance between the array and diffuser under study would range between 0.5 inches to 8 inches (12.5 mm to 200 mm). The observer would view the 4 inch×5 inch (100 mm×125 mm) surface from approximately 4 feet (1.3 m) and report if the diffuser sufficiently hid the LED light sources. A rating of "Yes" was given to those samples for which the observer reported that the film hid the source within the first 3 inches (76 mm) of distance between the array of LEDs and diffuser. A rating of "No" was given to those samples for which the observer reported that the film could not hide the LEDs within the full 8 inch range (the observer saw the individual LED sources through the film as bright points of light).

Fluorescent Blur Definition

Products used in fluorescent back lit signage range in clarity (up to 14.2%) as shown by the commercially available comparative samples having the properties described in Table 6. By deduction, a film having up to 14.2% clarity was defined as capable of sufficiently blurring fluorescent (tube) bulbs in typical back lit applications. A rating of "Yes" was given to those samples (see Table 5) having a clarity of up to 14.2%. (Note: all samples marked "Yes" had a clarity of less than 14.2%.)

Printing

Films were printed with the printers and ink, as described in Table 4.

Ink Adhesion Test

Ink adhesion of printed samples was tested as follows. Printed film was scribed with the corner of sharp razor blade cutting through the ink but not through the film. Many parallel scribes, separated by approximately 0.125 inches, were made. Another set of overlapping scribes were made at a right angle to first set of scribes, creating a crosshatched area about 1 square inch (in²) (6.5 cm²) square. A strip of 3M™ 232 masking tape (3M, Maplewood, MN) was firmly applied over the crosshatched area leaving a tab handle for removal. The masking tape was manually peeled from the printed crosshatch area rapidly. Masking tape was examined afterwards for residual ink. A "pass" condition was recorded when no residual ink was observed without magnification; if residual ink was observed on the tape, a "fail" condition was recorded.

A typical failure would be seen as missing sections or blocks of ink with in the cross hatch scribed area. A corresponding fleck of ink would be found on the strip of 3M™ 232 masking tape.

Whiteness Index Test

Whiteness index (WI) of samples (including, for example, UV ink printed samples) were measured using a Ci62 Spectrophotometer (X-Rite, Grand Rapids, MI) in accordance with ASTM E313-15e1 with a D65 source and a 10° observer. The WI was measured and reported for both the white printed and unprinted areas of a sample.

Color Measurement Test

The CIELab color space L*, a* and b* indices of UV ink printed samples were measured using a Ci62 Spectrophotometer (X-Rite, Grand Rapids, MI). The spectrophotometer used a D65 sources and a 10° observer. The white portion of a standard unsealed test chart from Leneta Company, Inc. (Mahwah, NJ) served as the white backing for measurements. The L*, a* and b* indices were reported.

The difference in color between measurements was completed by the standard method of calculating the Euclidean distance between the values in accordance with ASTM D2244-16. The $\Delta E^*_{ab}$ value was reported.

Calculation of Linear Density

To provide another means of comparing sample performance where the samples had different film sample thicknesses, "linear density" was defined as the product of mass fraction of the scattering element ($W_i$) and film thickness in micrometers (μm) (and has units of "($W_i$*μm)"). The mass fraction of the scattering elements ($W_i$) only included the non-solvent components in each calculation. The solvents were excluded in the mass fraction calculations. Those solvents excluded from the calculation were mineral spirits, xylol, and di-isobutyl ketone so as to only include components present after the drying and fusion process. By plotting the linear density against various measured properties of the films (for example, transmission or clarity), the effectiveness of scattering element can be evaluated for a broad range of thicknesses.

FIG. 5 and FIG. 6 compare the effect of plotting clarity versus mass fraction ($W_i$) and clarity versus linear density. In FIG. 5, samples having a mass fraction ($W_i$) of approximately 0.075 with a range of thicknesses appear to exhibit a proportional impact on the clarity, but when the thickness is accounted for by plotting clarity versus the linear density, as shown in FIG. 6, the samples distribute, allowing for a correlated evaluation of the effect of thickness and mass fraction, as a single dimension, on clarity.

TABLE 1

Silicone beads

|  | Spec Size (m) | Actual Size (m) |
| --- | --- | --- |
| T120 | NA | 2 |
| T130 | 2-3 | 3 |
| T2000B | 4-8 | 4.4 |
| T3000A | 3-9 | 4.1 |
| T1100 | 8-12 | 9.3 |

TABLE 2

Casting Liner

| | | Measured Gloss | | |
| --- | --- | --- | --- | --- |
| 60 deg gloss spec | 60 deg | 60 deg Stdev | 20 deg | 20 deg Stdev |
| >75 | 87.1 | 2.5 | 48.8 | 3.5 |

TABLE 3

| Bead Size (m) | Min. Linear Density (Wi* m) C < 14.2 | Mass fraction for 50 m film |
|---|---|---|
| T120 | 2 | 5.1 | 0.10 |
| T130 | 3 | 6 | 0.12 |
| T2000B | 4.4 | 13 | 0.26 |
| T3000A | 4.1 | 13 | 0.26 |
| T1100 | 9.3 | 15 | 0.30 |

Note: Table 3 columns are Bead Size (m), Min. Linear Density (Wi* m) C < 14.2, Mass fraction for 50 m film.

| | Bead Size (m) | Min. Linear Density (Wi* m) C < 14.2 | Mass fraction for 50 m film |
|---|---|---|---|
| T120 | 2 | 5.1 | 0.10 |
| T130 | 3 | 6 | 0.12 |
| T2000B | 4.4 | 13 | 0.26 |
| T3000A | 4.1 | 13 | 0.26 |
| T1100 | 9.3 | 15 | 0.30 |

TABLE 4

| | Printers | | |
|---|---|---|---|
| Printer | Manufacturer | Model | Ink Type |
| UV Ink Printer | EFI (Fremont, CA) | VUTEk GS3250LX | VUTEk GSLX-3M Superflex |
| Latex Printer | HP (Palo Alto, CA) | HP Latex 360 | 831A |
| Eco-Solvent | Roland DGA Corporation (Irvine, CA) | Soljet Pro4 XR-640 | MAX 2 |

TABLE 5

| Name | T120 | T130 | T1100 | T2000B | T3000A | Thickness (μm) | Transmission (%) | Haze (%) | Clarity (%) | Fluorescent Blur (Yes/No) | LED Blur (Yes/No) | Transmission > 70% (Yes/No) |
|---|---|---|---|---|---|---|---|---|---|---|---|---|
| | | Linear Density (Wi * μm) | | | | | | | | | | |
| A | | 6.6 | | | | 57 | 95.7 | 101 | 5.6 | Yes | Yes | Yes |
| B | | 7.5 | | | | 50 | 94.7 | 101 | 4.2 | Yes | Yes | Yes |
| C | | | | 13.0 | | 51 | 92.2 | 101 | 3.9 | Yes | Yes | Yes |
| D | 6.0 | | | | | 52 | 94.6 | 101 | 9.2 | Yes | No | Yes |
| E | | 5.1 | | | | 68 | 96 | 99.7 | 12.1 | Yes | No | Yes |
| F | | 6.0 | | | | 79 | 95.5 | 100 | 7.3 | Yes | No | Yes |
| L | | 4.1 | | | | 55 | 95.9 | 98.8 | 26.2 | No | No | Yes |
| M | | 4.7 | | | | 49 | 95.7 | 98.7 | 25.1 | No | No | Yes |
| N | | 3.8 | | | | 51 | 96 | 97.9 | 28.9 | No | No | Yes |
| O | | | 7.7 | | | 51 | 95.2 | 100 | 28.6 | No | No | Yes |
| P | | | 12.6 | | | 51 | 94.1 | 101 | 13.1 | Yes | No | Yes |
| Q | | | | 10.4 | | 52 | 95.4 | 92.3 | 25.7 | No | No | Yes |
| R | | | | 13.0 | | 52 | 95.2 | 96.6 | 14.9 | No | No | Yes |
| S | | | | | 7.4 | 51 | 95.5 | 99.7 | 25.9 | No | No | Yes |
| T | 4.4 | | | | | 47 | 94.5 | 100 | 24.2 | No | No | Yes |
| U | | 4.7 | | | | 49 | 95.7 | 98.7 | 25.1 | No | No | Yes |
| W | | | | | | 66 | 94.3 | 4.21 | 87.6 | No | No | Yes |
| X | 4.5 | | | | | 60 | 95.5 | 100 | 36.6 | No | No | Yes |
| Y | | 2.0 | | | | 53 | 95.2 | 89.5 | 67.3 | No | No | Yes |
| Z | | | | | 5.5 | 48 | 96.2 | 97.8 | 43.7 | No | No | Yes |

TABLE 6A

| Name | Reference | Source |
|---|---|---|
| R1 | 3735-50 | 3M ENVISION Diffuser Films 3735-50, available from 3M Company, St. Paul, MN |
| R2 | 3735-60 | 3M ENVISION Diffuser Films 3735-60 available from 3M Company, St. Paul, MN |
| R3 | 3635-30 | 3M Diffuser Film 3635-30 available from 3M Company, St. Paul, MN |
| R4 | 3635-70 | 3M Diffuser Film 3635-70 available from 3M Company, St. Paul, MN |
| R5 | WH14 | WH14 available from ACRYLITE, Sanford, ME |
| R6 | WT030 | WT030 available from ACRYLITE, Sanford, ME |
| R7 | IJ3650-114 | 3M SCOTCHCAL Graphic Film IJ3650-114 available from 3M Company, St. Paul, MN |

TABLE 6B

| Name | Referance | Transmission (%) | Haze (%) | Clarity | Fluorescent Blur (Yes/No) | LED Blur (Yes/No) | Transmission > 70% (Yes/No) |
|---|---|---|---|---|---|---|---|
| R1 | 3735-50 | 51.7 | 101.0 | 1.3 | Yes | Yes | No |
| R2 | 3735-60 | 64.7 | 102.0 | 1.9 | Yes | Yes | No |
| R3 | 3635-30 | 44.2 | 101.0 | 0.0 | Yes | Yes | No |
| R4 | 3635-70 | 62.5 | 101.0 | 14.2 | No | No | No |
| R5 | WH14 | 58.1 | 97.9 | 3.0 | Yes | Yes | No |
| R6 | WT030 | 36.5 | 101.0 | 0.0 | Yes | Yes | No |
| R7 | IJ3650-114 | 94.6 | 2.7 | 89.8 | No | No | Yes |

TABLE 7

| | Cyan UV Ink | | | Magenta UV Ink | | |
|---|---|---|---|---|---|---|
| | Printed Side (L*, a*, b*) | Unprinted Side (L*, a*, b*) | $\Delta E^*_{ab}$ | Printed Side (L*, a*, b*) | Unprinted Side (L*, a*, b*) | $\Delta E^*_{ab}$ |
| R2 | 53.78, −26.98, −41.84 | 66.21, −11.99, −25.26 | 25.6 | 49.89, 59.6, −6.68 | 64.92, 28.78, −2.95 | 34.5 |
| A | 56.89, −30.54, −37.49 | 56.17, −30.23, −37.26 | 0.8 | 52.6, 57.27, −9.09 | 51.22, 58.11, −8.31 | 1.8 |

| | Yellow UV Ink | | | White UV Ink | | |
|---|---|---|---|---|---|---|
| | Printed Side (L*, a*, b*) | Unprinted Side (L*, a*, b*) | $\Delta E^*_{ab}$ | Printed Side (L*, a*, b*) | Unprinted Side (L*, a*, b*) | $\Delta E^*_{ab}$ |
| R2 | 85.75, −5.71, 81.13 | 87.15, −1.08, 41.61 | 39.8 | 94.99, −0.87, 1.55 | 95.04, −0.94, 2.29 | 0.7 |
| A | 85.29, −6.91, 78.02 | 85.18, −6.14, 78.81 | 1.1 | 94.8, −0.99, 1.88 | 94.54, −1.36, 3.22 | 1.4 |

Example 1

Samples of diffuser films of Table 5 were produced as described in the Sample Preparation Methods.

Coating solutions were prepared using the clear base organosol with the addition of a silicone beads resulting in the linear densities reported in Table 5.

After removing the casting liner, the percent transmission (T %), percent haze (H %), and percent clarity (C %) of the resulting films were measured, as described above; results are shown in Table 5 and in FIG. 7.

Example 2

The films of Example 1 were evaluated for their ability to blur a point light sources using the LED Blur Assessment test. Commercially available comparative samples R1-R7 (see Table 6A) were also tested. The results are shown in Table 5 and Table 6B. The percent transmission (T %), percent haze (H %), and percent clarity (C %) of comparative samples R1-R7 are shown in Table 6B and FIG. 7.

To determine the level of clarity required to blur a light source, the film samples of Example 1 which include Tospearl® beads (T120, T130, T2000A, T2000B, and T1100; see Table 1) were assessed using the LED Blur Assessment Test. Film samples capable of blurring a LED point light source exhibited a clarity of up to 14.2% and a transmission of at least 70%. Film samples found capable of blurring an LED point light source exhibited a clarity of up to 5.6%.

Figure 8A:
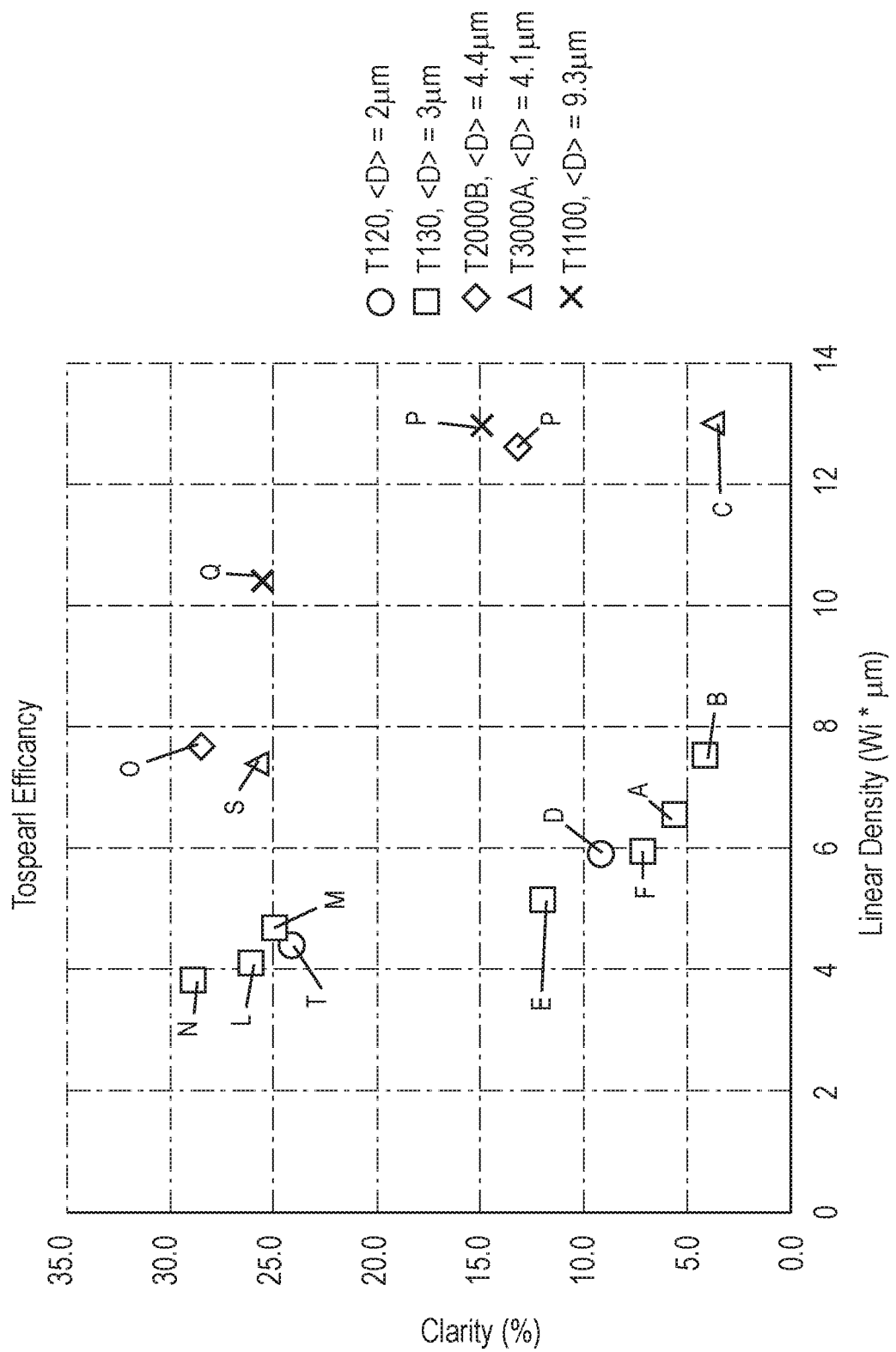
FIG. 8A shows linear density and clarity for the films made as described in Example 1 (see Table 5).

The relationship of linear density to clarity of these samples is shown in FIG. 8A; additional properties of the samples, including the ability to blur light sources is shown in Table 5.

Figure 8B:
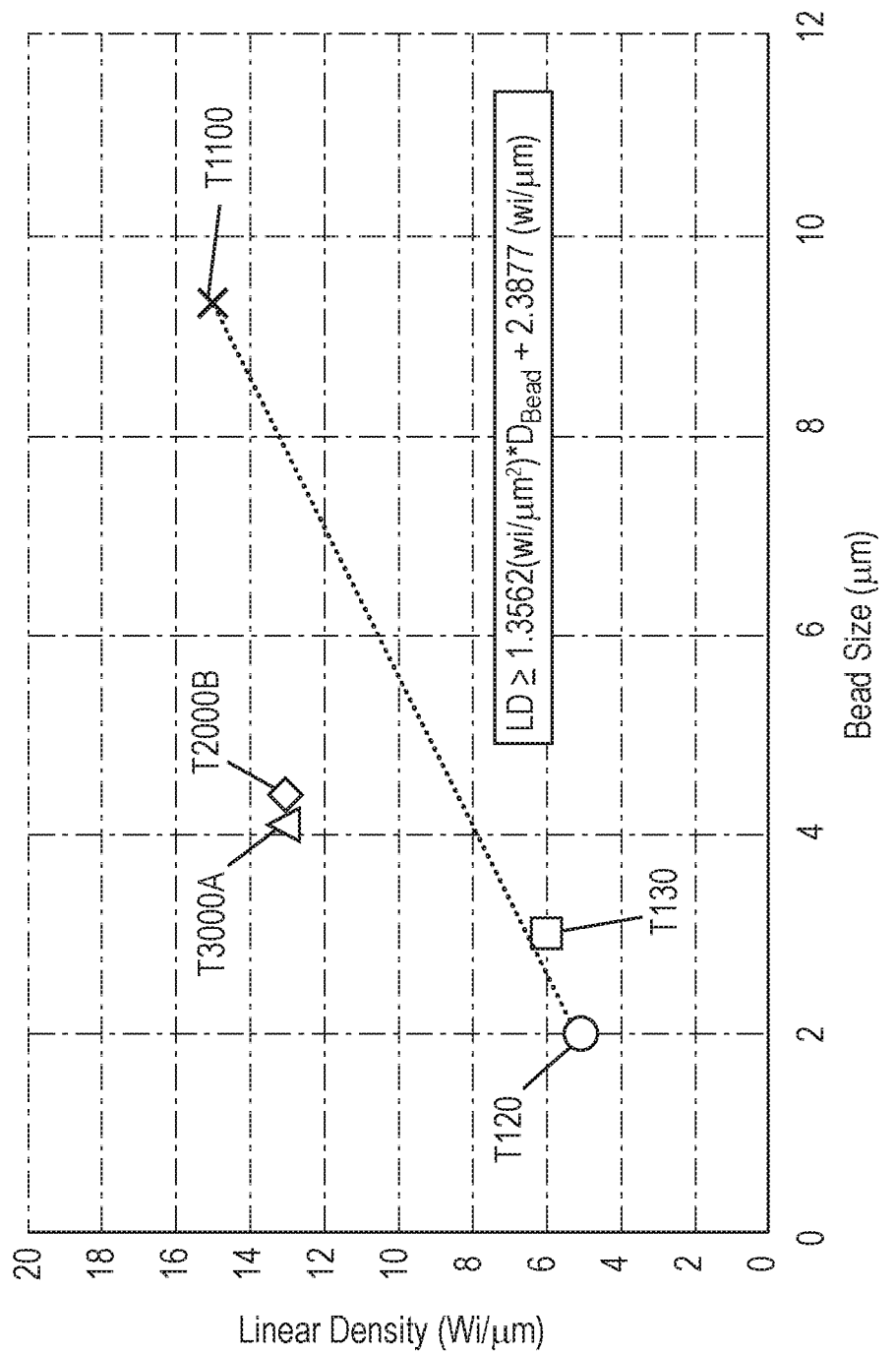
FIG. 8B shows the relationship between bead size and linear density calculated as described in Example 2.

As shown in FIG. 8B, the relationship between bead size and linear density was further evaluated for the samples of Example 1 that achieved a clarity of up to 14.2%. The minimum linear density reported in Table 3 was calculated from a linear extrapolation of the linear density and clarity for a given bead set (for example, T130), each extrapolation was rounded to a higher linear density to better estimate the linear density necessary to achieve a clarity of up to 14.2%, and the resulting values are reported in "Min. Linear Density" of Table 3. The minimum linear densities of Table 3 were plotted against bead size, and the minimum linear density necessary to achieve a clarity of up to 14.2% was calculated. This relationship can be represented as follows:

$$LD \geq 1.3562\left(\frac{W_i}{\mu m^2}\right)D_{Bead} + 2.3877\left(\frac{W_i}{\mu m}\right).$$

wherein "LD" is linear density, $W_i$ is the mass fraction of a silicone bead, $D_{Bead}$ is the mean particle diameter of the silicone bead, and $2 \leq D_{Bead} \leq 9.3$.

Similarly, the linear density needed to achieve a high transmission (that is, percent transmission greater than 70), a low clarity (that is, a percent clarity of up to 5.6) and the ability to blur a LED point light source, also depends on the size of the scattering element. Samples made using Tospearl beads having a diameter of up to 4 μm and a linear density of at least 6.6 $W_i$*μm exhibited a clarity of up to 5.6%; samples made using Tospearl beads having a diameter of up to 4.1 μm and a linear density of at least 8 $W_i$*μm exhibited a clarity of up to 5.6%.

Additionally, higher linear density resulted in lower clarity and smaller particles were more efficacious at decreasing the clarity than larger particles.

Example 3

Some of the samples of Example 1 and Comparative Examples R2 and R7 were printed with a UV-ink, an Eco-solvent-ink, and/or latex-ink. A list of printers can be found in Table 4. Samples A, X, Y, Z of Example 1 and Comparative Examples R2 and R7 were printed with UV inks. Samples A, X, Y and Z of Example 1 were printed with Eco-solvent inks. Sample X of Example 1 was printed with Latex ink. The resulting printed films were further tested to characterize their efficacy as a diffuser, printed substrate, and as a film. Results are shown in FIG. 9 and are further discussed below.

UV Ink-Printed Samples

Samples A, X, Y, Z of Example 1 and Comparative Examples R2 and R7 were printed with UV inks. Unprinted and printed samples were evaluated for transmission, clarity, and assessed for ability to blur a point light source using the LED Blur Assessment Test. Results are shown in FIG. 9.

Unprinted Sample R2 exhibited low clarity (3 1.9) but also exhibited a lower transmission (64.7) and a higher whiteness index (WI) than Samples A, X, Y, Z, and R7. When each sample was printed with 100% 600 dpi white UV ink, however, a WI comparable to Samples A, X, Y, Z, and R7 was observed for sample R2.

Samples printed with UV inks exhibited a clarity approximately the same or less than the clarity of the same unprinted sample and retained the ability to blur a point (LED) light source.

Sample A, which had the ability to blur LEDs had an unprinted transmission greater than 70%, also exhibited a significantly higher printed transmission than R2, the next highest transmission sample that was also capable of blurring LEDs.

As shown in FIG. 9, UV-ink printed Sample A had a transmission of 34.8% as compared to sample R2 which had a transmission of 21.8% for the cyan ink. A similar trend was also found for magenta and yellow ink colors.

Eco-Solvent-Ink-Printed Samples

Samples A, X, Y and Z of Example 1 were printed with Eco-solvent inks. Unprinted and printed samples were evaluated for transmission, clarity, and assessed for ability to blur a point light source using the LED Blur Assessment Test. Results are shown in FIG. 9.

Samples printed with Eco-solvent inks had a clarity approximately the same as the clarity of the unprinted samples (see FIG. 9). In other words, the solvent inks contributed little to diffusion, and the print substrate, even when printed with a solvent ink, relied entirely on the base film to provide diffusion.

Latex Ink-Printed Samples

Sample X of Example 1 was printed with Latex ink. Unprinted and printed samples were evaluated for transmission, clarity, and assessed for ability to blur a point light source using the LED Blur Assessment Test. Results are shown in FIG. 9.

The printed sample had a transmission and clarity approximately the same as Sample X printed with a solvent ink. As a result, the transmission and clarity of a sample printed with a latex ink is expected to be similar to that of the sample printed with a solvent ink. As with the solvent ink-printed samples, little effective decrease in the clarity was observed when a sample was printed with latex inks.

Example 4

Each sample of Example 3 was tested for ink adhesion. All samples were found to have a "pass" result for ink adhesion.

Example 5

Sample A of Example 1 and commercially available comparative Sample R2 were printed with UV-ink to form an ink layer, and a nominally clear pressure-sensitive adhesive (PSA) was applied to a major surface of a clear substrate and to the ink layer. (See FIG. 4C.)

Figure 10:
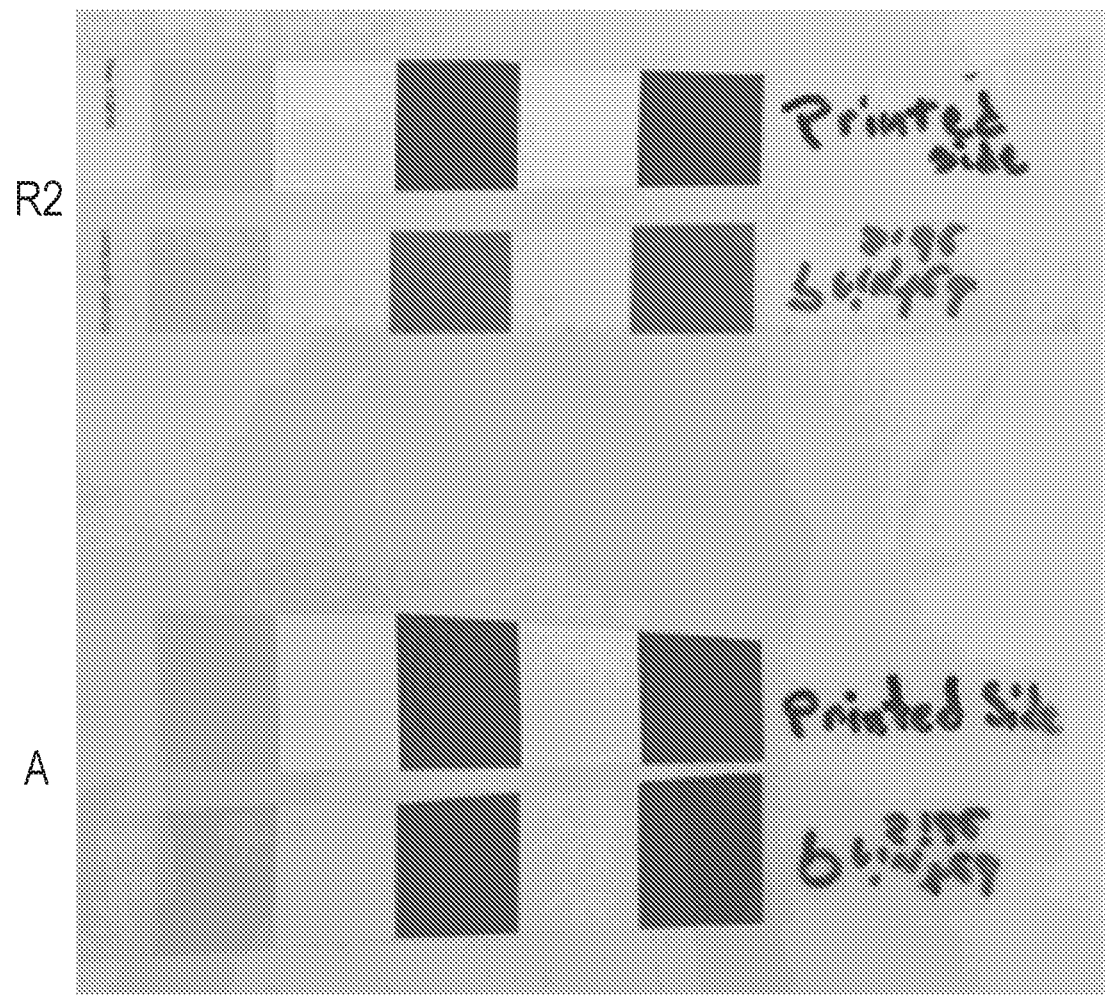
FIG. 10 shows printed films adhered to a clear PET with a nominally clear adhesive evaluated as described in Example 5. Top: Sample R2, described in Example 2; Bottom: Sample A, made as described in Example 1

As shown in FIG. 10, viewing the printed layer of sample A through the film sample does not wash out the graphic image. In comparison, comparative Sample R2 exhibited a more washed out appearance when viewed through the film sample as compared to when it was viewed through a clear substrate.

Figure 11:
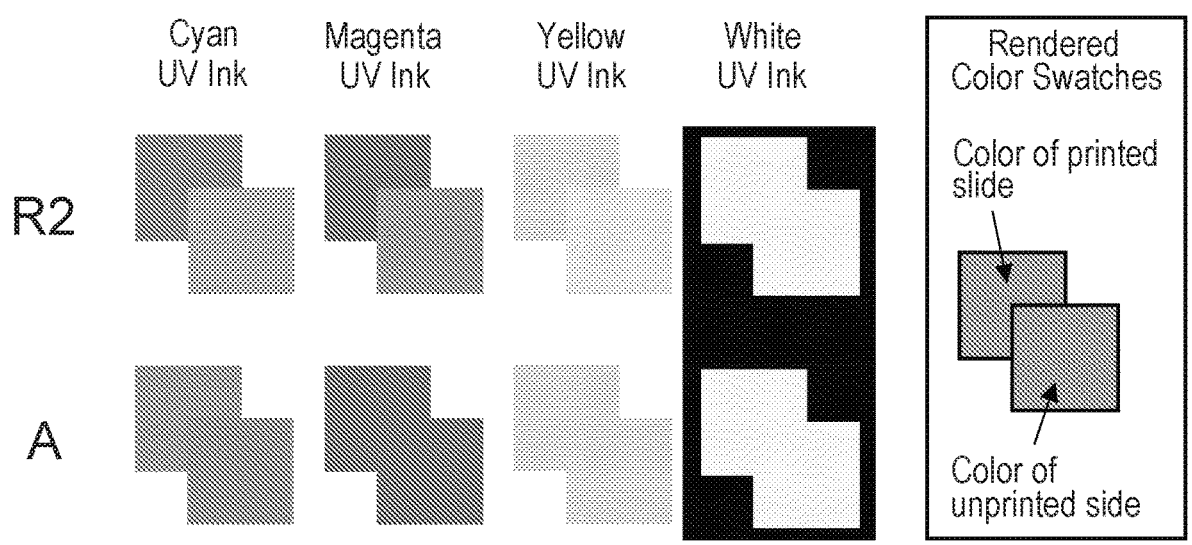
FIG. 11 shows side-by-side color renderings of the samples of FIG. 10, rendered with their equivalent sRGB values, as described in Example 5.

The color of the cyan, magenta, yellow and white printed areas were measured using the color measurement test. The measurements were taken for the printed side and unprinted sides of film R2 and sample A. The color values were reported and the color difference, $\Delta E^*_{ab}$, between the printed and unprinted side is reported in Table 7. The $\Delta E^*_{ab}$ values for sample A were less than of film R2. Side-by-side color renderings of the color printed side and unprinted side color pairs were rendered with their equivalent sRGB values in FIG. 11.

The complete disclosure of all patents, patent applications, and publications, and electronically available material cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A composition comprising
a bulk diffuser comprising a film having a major surface, the film comprising
a polymer, and
a scattering element, wherein the scattering element comprises a silicone bead having a mean particle diameter in a range of 2 micrometers (μm) to 9.3 μm; wherein the linear density of the film is at least $$1.3562\left(\frac{w_i}{\mu m^2}\right)D_{Bead} + 2.3877\left(\frac{w_i}{\mu m}\right),$$

wherein $W_i$ is the mass fraction of a silicone bead, $D_{Bead}$ is the mean particle diameter of the silicone bead, and $2 \leq D_{Bead} \leq 9.3$,
wherein the film exhibits a percent transmission of at least 90%, and a percent clarity of up to 14.2%, and a percent haze of at least 95%.

2. The composition of claim 1, wherein the mass fraction of the scattering element ($W_i$) does not exceed 0.64.

3. The composition of claim 1, wherein the major surface comprises an ink-receptive surface.

4. The composition of claim 3, wherein an ink layer is disposed directly on the ink-receptive surface of the film.

5. The composition of claim 4, wherein the ink layer comprises at least two, or at least three layers of ink.

6. The composition of claim 4, wherein the ink layer comprises a first layer of ink disposed directly on the ink-receptive surface of the film, a second layer of ink disposed on the first layer, and a third layer of ink disposed on the second layer, and further wherein the second layer of ink comprises a white ink.

7. The composition of claim 6, wherein at least one of the first layer of ink and the third layer of ink comprises a non-white ink.

8. The composition of claim 6, wherein the color difference, $\Delta E^*_{ab}$, between a printed first major surface of the film, wherein the ink layer is disposed directly on the ink-receptive surface of the film, and an unprinted second major surface of the film, is up to 3, up to 2.5, up to 2, up to 1.9, up to 1.8, up to 1.7, up to 1.6, up to 1.5, up to 1.4, up to 1.3, up to 1.2, up to 1.1, up to 1, up to 0.9, or up to 0.8 for the ink layer, wherein $\Delta E^*_{ab}$ is calculated in accordance with ASTM D2244-16.

9. The composition of claim 1, wherein the polymer comprises polyvinyl chloride (PVC), polyurethane, or poly lactic acid (PLA), or a combination thereof.

10. The composition of claim 1, wherein the scattering element comprises a spherical silicone bead.

11. The composition of claim 1, wherein the film further comprises a diffusing pigment.

12. The composition of claim 1, wherein the scattering element comprises methyl silsesquioxane.

13. The composition of claim 1, wherein the film comprises a cast film.

14. The composition of claim 1, wherein the composition further comprises a colored translucent film or an adhesive layer.

15. The composition of claim 1, wherein the film comprises multiple layers,
    wherein at least one layer comprises the scattering element, and
    wherein the film thickness comprises the thickness each layer comprising the scattering element, and further wherein the film thickness is weighted to adjust for the weighted average of the scattering element within each layer comprising the scattering element.

16. A method of making the composition of claim 1, wherein the method comprises mixing the polymer and the scattering element and forming a film.

17. A sign box comprising a substrate, an adhesive, and the composition of claim 1, wherein the adhesive is located between a major surface of the substrate and a second major surface of the film, and
    wherein an ink layer or a colored translucent film is located proximate to the first major surface of the film,
    wherein an ink layer or a colored translucent film is located between the adhesive and the second major surface of the film, or
    wherein an ink layer or a colored translucent film is located between the adhesive and the major surface of the substrate.

18. The sign box of claim 17, wherein the substrate comprises a clear substrate.

19. The sign box of claim 17, wherein the adhesive comprises a pressure sensitive adhesive (PSA), a hot melt adhesive, or a heat-activated adhesive, or a combination thereof.

\* \* \* \* \*